United States Patent
Takahashi et al.

(10) Patent No.: US 11,190,999 B2
(45) Date of Patent: Nov. 30, 2021

(54) USER EQUIPMENT, MOBILE COMMUNICATION SYSTEM, AND CELL SELECTION METHOD

(71) Applicant: NTT DOCOMO, INC., Tokyo (JP)

(72) Inventors: Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 689 days.

(21) Appl. No.: 15/754,969

(22) PCT Filed: Aug. 22, 2016

(86) PCT No.: PCT/JP2016/074352
§ 371 (c)(1),
(2) Date: Feb. 23, 2018

(87) PCT Pub. No.: WO2017/033882
PCT Pub. Date: Mar. 2, 2017

(65) Prior Publication Data
US 2020/0252884 A1 Aug. 6, 2020

(30) Foreign Application Priority Data

Aug. 27, 2015 (JP) .............................. JP2015-168340
Sep. 25, 2015 (JP) .............................. JP2015-188869

(Continued)

(51) Int. Cl.
*H04W 36/30* (2009.01)
*H04W 52/24* (2009.01)
(Continued)

(52) U.S. Cl.
CPC ......... *H04W 36/30* (2013.01); *H04W 52/245* (2013.01); *H04W 52/36* (2013.01); *H04W 72/085* (2013.01); *H04W 72/10* (2013.01)

(58) Field of Classification Search
CPC ...... H04W 52/00; H04W 72/00; H04W 36/00
See application file for complete search history.

(56) References Cited

U.S. PATENT DOCUMENTS

| | | | |
|---|---|---|---|
| 2016/0212663 A1* | 7/2016 | Uemura | H04W 48/16 |
| 2016/0316411 A1* | 10/2016 | Jung | H04W 4/70 |
| 2017/0118701 A1* | 4/2017 | Kim | H04W 48/20 |

OTHER PUBLICATIONS

Nokia Networks, Multiple NS/P-max handling, 3GPP TSG-RAN WG2 Meeting #91, Beijing, China, Aug. 24-28, 2015, R2-153460. (Year: 2015).*

(Continued)

*Primary Examiner* — Jung H Park
*Assistant Examiner* — Sumitra Ganguly
(74) *Attorney, Agent, or Firm* — Osha Bergman Watanabe & Burton LLP

(57) ABSTRACT

A user equipment includes: selection means configured to receive a plurality of signaling values and a plurality of maximum transmission power values corresponding to the plurality of signaling values from a base station, to select one signaling value of the plurality of signaling values, and to select the maximum transmission power value corresponding to the selected signaling value; and control means configured to perform cell selection or cell reselection by determining whether a reception level value in a cell to be determined satisfies a predetermined condition using a correction value, which is obtained by subtracting a compensation value based on the maximum transmission power value from a minimum reception level value predetermined for the cell to be determined in the cell selection or cell reselection, and the reception level value measured for the cell to be determined.

6 Claims, 24 Drawing Sheets

(30) Foreign Application Priority Data

Oct. 7, 2015 (JP) .............................. JP2015-199798
Nov. 2, 2015 (JP) .............................. JP2015-216174
Nov. 19, 2015 (JP) .............................. JP2015-226978

(51) Int. Cl.
*H04W 52/36* (2009.01)
*H04W 72/08* (2009.01)
*H04W 72/10* (2009.01)

(56) References Cited

OTHER PUBLICATIONS

3GPP TS 36.304 v12.7.0 (Dec. 2015), 3 rd Generation Partnership Project; Technical Specification Group Radio Access Network; Evolved Universal Terrestrial Radio Access (E-UTRA); User Equipment (UE) procedures in idle mode (Release 12). (Year: 2015).*
Extended European Search Report issued in corresponding European Application No. 16839229.8, dated Aug. 2, 2018 (18 pages).
NTT DOCOMO, Inc; "Enabling multiple NS and P-MAX operation per cell"; 3GPP TSG-RAN WG2 Meeting #92, R2-156858;Anaheim, USA; Nov. 16-20, 2015 (3 pages).
3GPP TS 36.304 V12.7.0; "3rd Generation Partnership Project; Technical Specification Group Radio Access Network; Evolved Universal Terrestrial Radio Access (E-UTRA); User Equipment (UE) procedures in idle mode (Release 12)"; Dec. 2015 (38 pages).
First Examination Report issued in corresponding New Zealand Patent Application No. 740156, dated Aug. 21, 2018 (4 pages).
Office Action issued in the counterpart Chinese Patent Application No. 201680049380.5, dated Apr. 2, 2020 (28 pages).
Extended European Search Report issued in counterpart European Patent Application No. 19158788.0, dated Apr. 11, 2019 (13 pages).
Partial Supplementary European Search Report issued in the counterpart European Patent Application No. 16839229.8, dated May 5, 2018 (20 pages).
Samsung; "Cell Selection/Reselection for Rel-13 low complexity MTC"; 3GPP TSG RAN WG2 #91 R2-153447; Beijing, P.R.China, Aug. 24-28, 2015 (3 pages).
NTT Docomo, Inc.; "Potential coverage issue on multiple NS/P-Max"; 3GPP TSG-RAN WG2 #91bis R2-154535; Malmö, Sweden, Oct. 5-9, 2015 (3 pages).
International Search Report issued in PCT/JP2016/074352 dated Nov. 8, 2016 (7 pages).
Written Opinion of the International Searching Authority issued in PCT/JP2016/074352 dated Nov. 8, 2016 (4 pages).
3GPP TS 36.101 V12.8.0; "3rd Generation Partnership Project; Technical Specification Group Radio Access Network; Evolved Universal Terrestrial Radio Access (E-UTRA); User Equipment (UE) radio transmission and reception (Release 12)"; Jul. 2015 (691 pages).
3GPP TS 36.331 V12.6.0; "3rd Generation Partnership Project; Technical Specification Group Radio Access Network; Evolved Universal Terrestrial Radio Access (E-UTRA); Radio Resource Control (RRC) Protocol specification (Release 12)"; Jun. 2015 (449 pages).
Nokia Networks; "Multiple NS/P-max handling"; 3GPP TSG-RAN WG2 Meeting #91, R2-153460; Beijing, China; Aug. 24-28, 2015 (4 pages).
Nokia Networks; "Introduction of Multiple NS and Pmax"; 3GPP TSG-RAN WG2 Meeting #91, R2-153468; Beijing, China; Aug. 24-28, 2015 (12 pages).
3GPP TS 36.304 V12.5.0; "3rd Generation Partnership Project; Technical Specification Group Radio Access Network; Evolved Universal Terrestrial Radio Access (E-UTRA); User Equipment (UE) procedures in idle mode (Release 12)"; Jun. 2015 (38 pages).
3GPP TS 36.306 V12.5.0; "3rd Generation Partnership Project; Technical Specification Group Radio Access Network; Evolved Universal Terrestrial Radio Access (E-UTRA); User Equipment (UE) radio access capabilities (Release 12)"; Jun. 2015 (44 pages).

\* cited by examiner

FIG.1

Table 6.2.4-1: Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | N/A |
| NS_05 | 6.6.3.3.1 | 1 | 10,15,20 | ≥ 50 | ≤ 1 |
| NS_07 | 6.6.2.2.3 6.6.3.3.2 | 13 | 10 | Table 6.2.4-2 | |
| NS_17 | 6.6.3.3.10 | 28 | 5, 10 | Table 5.6-1 | N/A |

FIG.4

```
                        SystemInformationBlockType1 message
-- ASN1START
SystemInformationBlockType1 ::=    SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                         ENUMERATED {barred, notBarred},
        intraFreqReselection               ENUMERATED {allowed, notAllowed},
        csg-Indication                     BOOLEAN,
        csg-Identity                       CSG-Identity         OPTIONAL  -- Need OR
    },
    cellSelectionInfo                  SEQUENCE {
        q-RxLevMin                         Q-RxLevMin,
        q-RxLevMinOffset                   INTEGER (1..8)       OPTIONAL  -- Need OP
    },
    p-Max                              P-Max                    OPTIONAL,        -- Need OP
    freqBandIndicator                  FreqBandIndicator,
    schedulingInfoList                 SchedulingInfoList,
    tdd-Config                         TDD-Config               OPTIONAL,-- Cond TDD
    si-WindowLength                    ENUMERATED {
                                           ms1, ms2, ms5, ms10, ms15, ms20,
                                           ms40},
    systemInfoValueTag                 INTEGER (0..31),
    nonCriticalExtension               SystemInformationBlockType1-v890-IEs
OPTIONAL
}
SystemInformationBlockType1-v920-IEs ::=
    ims-EmergencySupport-r9            ENUMERATED {true}
    cellSelectionInfo-v920             CellSelectionInfo-v920   OPTIONAL,-- Cond RSRQ
    nonCriticalExtension               SEQUENCE {}              OPTIONAL  -- Need OP
}
SystemInformationBlockType1-v9xx-IEs ::=   SEQUENCE {
    P-maxValues                        SEQUENCE (SIZE (1..maxMultiBands+1)) OF P-maxNS-valueList
OPTIONAL,-- Need OR
    nonCriticalExtension               SEQUENCE {}                          OPTIONAL -- Need OP
}
P-maxNS-valueList ::=                  SEQUENCE {
    p-maxPerNS-value                   SEQUENCE (SIZE (1..maxNS-values) of P-maxPerNS-value
    }
P-maxPerNS-value ::=                   SEQUENCE {
    p-maxNew                           P-max       OPTIONAL -- Need OP
    additionalSpectrumEmission AdditionalSpectrumEmission
    }

PLMN-IdentityList ::=                  SEQUENCE (SIZE (1..6)) OF PLMN-IdentityInfo PLMN-IdentityInfo ::=                  SEQUENCE {
    plmn-Identity                          PLMN-Identity,
    cellReservedForOperatorUse             ENUMERATED {reserved, notReserved}
}

SchedulingInfoList ::= SEQUENCE (SIZE (1..maxSI-Message)) OF SchedulingInfo

SchedulingInfo ::=SEQUENCE {
    si-Periodicity                         ENUMERATED {
                                               rf8, rf16, rf32, rf64, rf128, rf256, rf512},
    sib-MappingInfo                        SIB-MappingInfo
```

FIG.5

| SystemInformationBlockType1 field descriptions |
|---|
| *p-Max* <br> Value applicable for the cell. If absent the UE applies the maximum power according to the UE capability. |
| *P-maxValues* <br> A list of P-max and NS-values for the band  i.e. First *P-maxList* contains P-max values corresponding to *freqBandIndicator*. Subsequent *P-maxLists* correspond to each additional frequency band included in *multiBandInfoList* in *SystemInformationBlockType1*, listed in the same order. <br><br> The UE shall apply the first supported additional spectrum emission in the list of the selected band, and use the corresponding *p-MaxNew*. If none of the additional spectrum emission values in the list are supported, the UE shall use *p-Max*. |

FIG.6

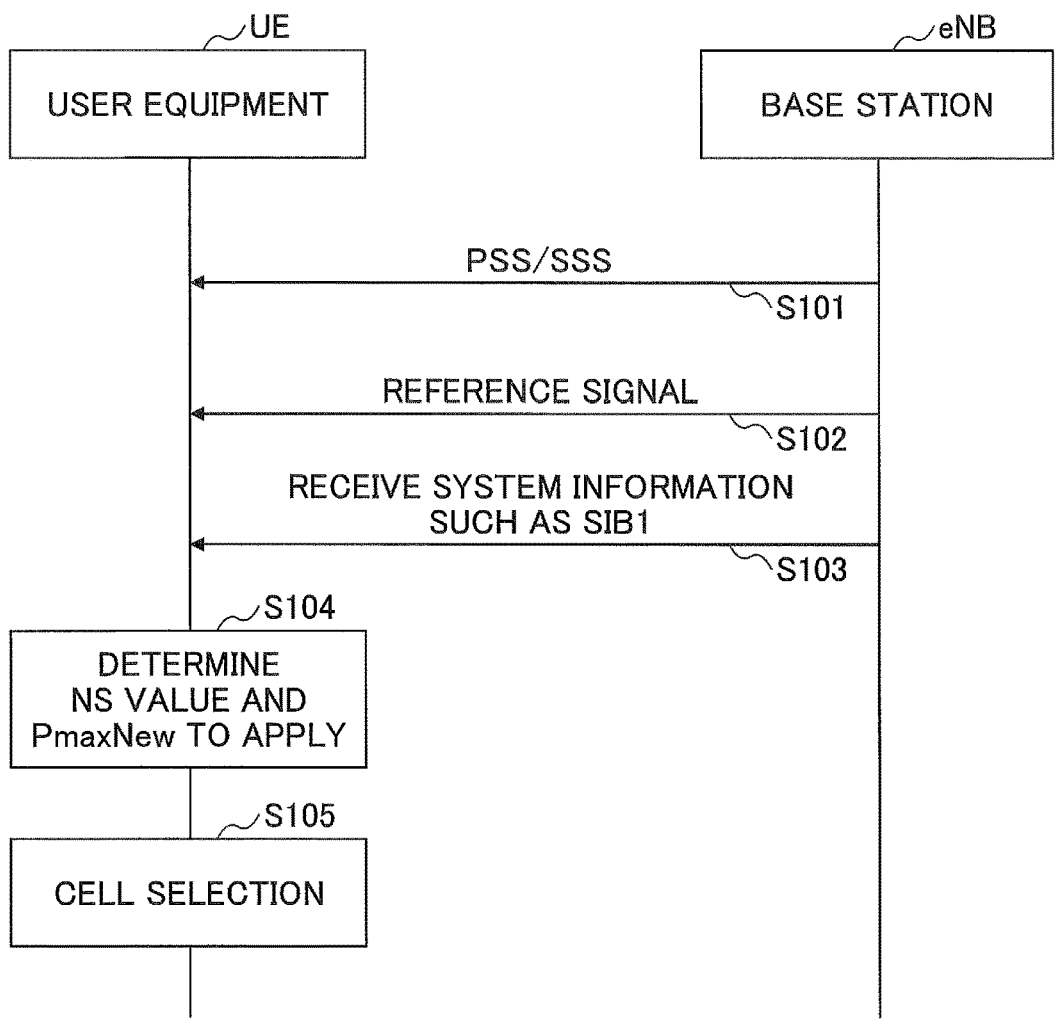

FIG.7

5.2.3.2 Cell Selection Criterion

The cell selection criterion S is fulfilled when:

Srxlev > 0 AND Squal > 0 where:

$Srxlev = Q_{rxlevmeas} - (Q_{rxlevmin} + Q_{rxlevminoffset}) - Pcompensation - Qoffset_{temp}$ _+ P<u>EMAX</u>compensation_

$Squal = Q_{qualmeas} - (Q_{qualmin} + Q_{qualminoffset}) - Qoffset_{temp}$ where:

| Srxlev | Cell selection RX level value (dB) |
|---|---|
| Squal | Cell selection quality value (dB) |
| Qoffset_temp | Offset temporarily applied to a cell as specified in [3] (dB) |
| Q_rxlevmeas | Measured cell RX level value (RSRP) |
| Q_qualmeas | Measured cell quality value (RSRQ) |
| Q_rxlevmin | Minimum required RX level in the cell (dBm) |
| Q_qualmin | Minimum required quality level in the cell (dB) |
| Q_rxlevminoffset | Offset to the signalled $Q_{rxlevmin}$ taken into account in the Srxlev evaluation as a result of a periodic search for a higher priority PLMN while camped normally in a VPLMN [5] |
| Q_qualminoffset | Offset to the signalled $Q_{qualmin}$ taken into account in the Squal evaluation as a result of a periodic search for a higher priority PLMN while camped normally in a VPLMN [5] |
| Pcompensation | max($P_{EMAX} - P_{PowerClass}$, 0) (dB) |
| P_EMAX | Maximum TX power level an UE may use when transmitting on the uplink in the cell (dBm) defined as $P_{EMAX}$ in [TS 36.101] |
| P_PowerClass | Maximum RF output power of the UE (dBm) according to the UE power class as defined in [TS 36.101] |
| P<u>EMAX</u>compensation | Max(PmaxNew – Pmax, 0) (dB) |
| PmaxNew | PmaxNew in the P-maxNS-valueList in SIB1 selected by the UE |
| Pmax | Pmax (without siffix) in SIB1 |

The signalled values $Q_{rxlevminoffset}$ and $Q_{qualminoffset}$ are only applied when a cell is evaluated for cell selection as a result of a periodic search for a higher priority PLMN while camped normally in a VPLMN [5]. During this periodic search for higher priority PLMN the UE may check the S criteria of a cell using parameter values stored from a different cell of this higher priority PLMN.

FIG.9

5.2.3.2 Cell Selection Criterion

The cell selection criterion S is fulfilled when:

Srxlev > 0  AND  Squal > 0 where:

Srxlev = $Q_{rxlevmeas} - (Q_{rxlevmin} + Q_{rxlevminoffset})$ − Pcompensation

Squal = $Q_{qualmeas} - (Q_{qualmin} + Q_{qualminoffset})$ where:

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | If the UE supports the *additionalPmax* in the *NS-PmaxList*, if present, in SIB1 and SIB5:<br>max($P_{EMAX1}$ −$P_{PowerClass}$, 0) − (min($P_{EMAX2}$, $P_{PowerClass}$) − min($P_{EMAX1}$, $P_{PowerClass}$)) (dB);<br>else:<br>max($P_{EMAX1}$ −$P_{PowerClass}$, 0) (dB); |
| $P_{EMAX1}$, $P_{EMAX2}$ | Maximum TX power level an UE may use when transmitting on the uplink in the cell (dBm) defined as $P_{EMAX}$ in [TS 36.101]. $P_{EMAX1}$ and $P_{EMAX2}$ are obtained from the *p-Max* and the *NS-PmaxList* respectively in SIB1 and SIB5 as specified in TS 36.331 [3]. |
| $P_{PowerClass}$ | Maximum RF output power of the UE (dBm) according to the UE power class as defined in [TS 36.101] |

The signalled values $Q_{rxlevminoffset}$ and $Q_{qualminoffset}$ are only applied when a cell is evaluated for cell selection as a result of a periodic search for a higher priority PLMN while camped normally in a VPLMN [5]. During this periodic search for higher priority PLMN the UE may check the S criteria of a cell using parameter values stored from a different cell of this higher priority PLMN.

FIG.10

```
                           SystemInformationBlockType1 message
-- ASN1START

SystemInformationBlockType1 ::=    SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                         ENUMERATED {barred, notBarred},
        intraFreqReselection               ENUMERATED {allowed, notAllowed},
        csg-Indication                     BOOLEAN,
        csg-Identity                       CSG-Identity         OPTIONAL      -- Need OR
    },
```

```
SystemInformationBlockType1-v920-IEs ::= SEQUENCE {
    ims-EmergencySupport-r9         ENUMERATED {true}             OPTIONAL,      -- Need OR
    cellSelectionInfo-v920          CellSelectionInfo-v920        OPTIONAL,      -- Cond RSRQ
    nonCriticalExtension            SEQUENCE {}                   OPTIONAL       -- Need OP
}

SystemInformationBlockType1-v9xx-IEs ::= SEQUENCE {
    P-maxValues                     SEQUENCE (SIZE (1..maxMultiBands+1)) OF P-maxList
OPTIONAL,-- Need OR
    nonCriticalExtension            SEQUENCE {}                                  OPTIONAL -- Need OP
}

P-maxNS-valueList ::=                   SEQUENCE {
        p-maxPerNS-value                SEQUENCE (SIZE (1..maxNS-values) of P-maxPerNS-value
        }

P-maxPerNS-value ::=                    SEQUENCE {
        p-maxNew                        P-max        OPTIONAL,       -- Need OP
        additionalSpectrumEmission      AdditionalSpectrumEmission,
        q-RxLevMin-PmaxNew              Q-RxLevMin                   -- Need OP
        }

PLMN-IdentityList ::=              SEQUENCE (SIZE (1..6)) OF PLMN-IdentityInfo

PLMN-IdentityInfo ::=              SEQUENCE {
    plmn-Identity                      PLMN-Identity,
    cellReservedForOperatorUse         ENUMERATED {reserved, notReserved}
}

SchedulingInfoList ::= SEQUENCE (SIZE (1..maxSI-Message)) OF SchedulingInfo

SchedulingInfo ::=     SEQUENCE {
    si-Periodicity                     ENUMERATED {
                                           rf8, rf16, rf32, rf64, rf128, rf256, rf512},
    sib-MappingInfo                    SIB-MappingInfo
}

SIB-MappingInfo ::=    SEQUENCE (SIZE (0..maxSIB-1)) OF SIB-Type

SIB-Type ::=                       ENUMERATED {
```

FIG.11

| SystemInformationBlockType1 field descriptions |
|---|
| *p-Max*<br>Value applicable for the cell. If absent the UE applies the maximum power according to the UE capability. |
| *P-maxValues*<br>A list of P-max and NS-values for the band i.e. First *P-maxList* contains P-max values corresponding to *freqBandIndicator*. Subsequent *P-maxLists* correspond to each additional frequency band included in *multiBandInfoList* in *SystemInformationBlockType1*, listed in the same order.<br><br>The UE shall apply the first supported additional spectrum emission in the list of the selected band, and use the corresponding p-MaxNew and *q-RxLevMin-PmaxNew* for cell selection. If none of the additional spectrum emission values in the list are supported, the UE shall use *p-Max* and *q-RxLevMin* for cell selection. |

FIG.12

```
                    SystemInformationBlockType5 information element

-- ASN1START

SystemInformationBlockType5 ::=      SEQUENCE {
    interFreqCarrierFreqList            InterFreqCarrierFreqList,
    ...,
    lateNonCriticalExtension               OCTET STRING (CONTAINING SystemInformationBlockType5-
v8h0-IEs)            OPTIONAL     -- Need OP
}

SystemInformationBlockType5-v8h0-IEs ::=     SEQUENCE {
    interFreqCarrierFreqList-v8h0 SEQUENCE (SIZE (1..maxFreq)) OF InterFreqCarrierFreqInfo-v8h0
        OPTIONAL,-- Need OP
    nonCriticalExtension        SystemInformationBlockType5-v9e0-IEs     OPTIONAL -- Need OP
}

SystemInformationBlockType5-v9e0-IEs ::=     SEQUENCE {
    interFreqCarrierFreqList-v9e0  SEQUENCE (SIZE (1..maxFreq)) OF InterFreqCarrierFreqInfo-v9e0
        OPTIONAL,        -- Need OR
    nonCriticalExtension        SystemInformationBlockType5-v9xy-IEs
        OPTIONAL        -- Need OP
}

SystemInformationBlockType5-v9xy-IEs ::=      SEQUENCE {
    interFreqCarrierFreqList-v9xy  SEQUENCE (SIZE (1..maxFreq)) OF InterFreqCarrierFreqInfo-v9xy
        OPTIONAL,       -- Need OR
    nonCriticalExtension       SEQUENCE {}                        OPTIONAL      -- Need OP
}

InterFreqCarrierFreqList ::=        SEQUENCE (SIZE (1..maxFreq)) OF InterFreqCarrierFreqInfo InterFreqCarrierFreqInfo ::=   SEQUENCE {
    dl-CarrierFreq                 ARFCN-ValueEUTRA,
    q-RxLevMin                     Q-RxLevMin,
    p-Max                          P-Max                          OPTIONAL,    -- Need OP InterFreqCarrierFreqInfo-v9e0 ::=SEQUENCE {
    dl-CarrierFreq-v9e0            ARFCN-ValueEUTRA-v9e0 OPTIONAL,    -- Cond dl-FreqMax
    multiBandInfoList-v9e0         MultiBandInfoList-v9e0 OPTIONAL    -- Need OR
}

InterFreqCarrierFreqInfo-v9xy ::=SEQUENCE {
    multiMPR-InfoList-r9           SEQUENCE (SIZE (1..maxA-MPRs-r9)) OF MPR-Info-r9 OPTIONAL
        -- Need OR
}

InterFreqNeighCellList ::=     SEQUENCE (SIZE (1..maxCellInter)) OF InterFreqNeighCellInfo InterFreqNeighCellInfo ::=     SEQUENCE {
    physCellId                     PhysCellId,
    q-OffsetCell                   Q-OffsetRange
}

InterFreqBlackCellList ::=     SEQUENCE (SIZE (1..maxCellBlack)) OF PhysCellIdRange MPR-Info-r9 ::=      SEQUENCE {
    additionalSpectrumEmission     AdditionalSpectrumEmission,
    p-Max                          P-Max                          OPTIONAL,    -- Need OP
}

-- ASN1STOP
```

FIG.13

| SystemInformationBlockType5 field descriptions |
|---|
| *multiBandInfoList*<br>Indicates the list of frequency bands in addition to the band represented by *dl-CarrierFreq* for which cell reselection parameters are common. E-UTRAN indicates at most *maxMultiBands* frequency bands (i.e. the total number of entries across both *multiBandInfoList* and *multiBandInfoList-v9e0* is below this limit). |
| *multiMPR-InfoList*<br>A list of *additionalSpectrumEmission* and the associated Pmax in the order of priority. If p-Max is absent in the MPR-Info, the UE shall consider the *P-Max* in the *InterFreqCarrierFreqInfo* (without suffix) applicable. If the UE does not support any of the *additionalSpectrumEmission* in the list, the UE shall consider the *P-Max* in the *InterFreqCarrierFreqInfo* (without suffix) applicable. |
| *p-Max*<br>Value applicable for the neighbouring E-UTRA cells on this carrier frequency. If absent the UE applies the maximum power according to the UE capability. |
| *threshX-High*<br>Parameter "Thresh$_{X, HighP}$" in TS 36.304 [4]. |
| *threshX-Low*<br>Parameter "Thresh$_{X, LowP}$" in TS 36.304 [4]. |
| *t-ReselectionEUTRA*<br>Parameter "Treselection$_{EUTRA}$" in TS 36.304 [4]. |
| *t-ReselectionEUTRA-SF*<br>Parameter "Speed dependent ScalingFactor for Treselection$_{EUTRA}$" in TS 36.304 [4]. If the field is not present, the UE behaviour is specified in TS 36.304 [4]. |
| *q-OffsetFreq*<br>Parameter "Qoffset$_{frequency}$" in TS 36.304 [4]. |
| *interFreqNeighCellList*<br>List of inter-frequency neighbouring cells with specific cell re-selection parameters. |
| *q-OffsetCell*<br>Parameter "Qoffset$_{s,n}$" in TS 36.304 [4]. |
| *interFreqBlackCellList*<br>List of blacklisted inter-frequency neighbouring cells. |
| *interFreqCarrierFreqList*<br>List of neighbouring inter-frequencies. E-UTRAN does not configure more than one entry for the same physical frequency regardless of the E-ARFCN used to indicate this. If E-UTRAN includes *interFreqCarrierFreqList-v8h0* and/ or *interFreqCarrierFreqList-v9e0* and/or *interFreqCarrierFreqList-v9xy* it includes the same number of entries, and listed in the same order, as in *interFreqCarrierFreqList* (i.e. without suffix). See Annex D for more descriptions. |
| *q-QualMin*<br>Parameter "Q$_{qualmin}$" in TS 36.304 [4]. If the field is not present, the UE applies the (default) value of negative infinity for Q$_{qualmin}$. |
| *threshX-HighQ*<br>Parameter "Thresh$_{X, HighQ}$" in TS 36.304 [4]. |
| *threshX-LowQ*<br>Parameter "Thresh$_{X, LowQ}$" in TS 36.304 [4]. |

FIG.14

```
                    SystemInformationBlockType5 information element
-- ASN1START SystemInformationBlockType5 ::=    SEQUENCE {
    interFreqCarrierFreqList            InterFreqCarrierFreqList,
    ...,
    lateNonCriticalExtension            OCTET STRING (CONTAINING SystemInformationBlockType5-
v8h0-IEs)                 OPTIONAL    -- Need OP
```

```
    ...,
    [[  q-QualMin-r9                    Q-QualMin-r9
        threshX-Q-r9                    SEQUENCE {
            threshX-HighQ-r9                ReselectionThresholdQ-r9,
            threshX-LowQ-r9                 ReselectionThresholdQ-r9
        }                                                       OPTIONAL        -- Cond RSRQ
    ]]
}

InterFreqCarrierFreqInfo-v8h0 ::=  SEQUENCE {
    multiBandInfoList                   MultiBandInfoList       OPTIONAL        -- Need OR
}

InterFreqCarrierFreqInfo-v9e0 ::=  SEQUENCE {
    dl-CarrierFreq-v9e0                 ARFCN-ValueEUTRA-v9e0   OPTIONAL,       -- Cond dl-FreqMax
    multiBandInfoList-v9e0              MultiBandInfoList-v9e0  OPTIONAL        -- Need OR
}

InterFreqCarrierFreqInfo-v9xx ::=  SEQUENCE {
    multiBandInfoListP-max          SEQUENCE (SIZE (1..maxMultiBands)) OF P-maxNS-value
OPTIONAL, -- Need OR
    nonCriticalExtension            SEQUENCE {}                 OPTIONAL        -- Need OP
}

SystemInformationBlockType5-v9xx-IEs ::=    SEQUENCE {
    interFreqCarrierFreqList-v9e0   SEQUENCE (SIZE (1..maxFreq)) OF InterFreqCarrierFreqInfo-
v9xx            OPTIONAL, -- Need OR
    nonCriticalExtension            SEQUENCE {}                 OPTIONAL        -- Need OP
}

P-maxPerNS-value ::=                SEQUENCE {
        p-maxNew                        P-max           OPTIONAL,       -- Need OP
        additionalSpectrumEmission      AdditionalSpectrumEmission,
        q-RxLevMin-PmaxNew              Q-RxLevMin                      -- Need OP
        }

InterFreqNeighCellList ::=          SEQUENCE (SIZE (1..maxCellInter)) OF InterFreqNeighCellInfo InterFreqNeighCellInfo ::=          SEQUENCE {
    physCellId                          PhysCellId,
    q-OffsetCell                        Q-OffsetRange
}

InterFreqBlackCellList ::=          SEQUENCE (SIZE (1..maxCellBlack)) OF PhysCellIdRange

-- ASN1STOP
```

FIG.15

| SystemInformationBlockType5 field descriptions |
|---|
| *p-Max*<br>Value applicable for the neighbouring E-UTRA cells on this carrier frequency. If absent the UE applies the maximum power according to the UE capability. |
| *multiBandInfoListP-max*<br>A list of P-max and NS-values values for the band. There is *P-maxNS-value* for each additional frequency band included in *multiBandInfoList*, listed in the same order.<br><br>The UE shall apply the first additional spectrum emission in the list that it supports, and use the corresponding p-MaxNew and *q-RxLevMin-PmaxNew* for cell selection. If none of the additional spectrum emission values in the list are supported, the UE shall use *p-Max* and *q-RxLevMin* for cell selection. |

FIG.16

```
                    SystemInformationBlockType3 information element
-- ASN1START SystemInformationBlockType3 ::=    SEQUENCE {
    cellReselectionInfoCommon          SEQUENCE {
        q-Hyst                             ENUMERATED {
                                               dB0, dB1, dB2, dB3, dB4, dB5, dB6, dB8, dB10,
                                               dB12, dB14, dB16, dB18, dB20, dB22, dB24},
        speedStateReselectionPars          SEQUENCE {
            mobilityStateParameters            MobilityStateParameters,
            q-HystSF                           SEQUENCE {
                sf-Medium                          ENUMERATED {
                                                       dB-6, dB-4, dB-2, dB0},
                sf-High                            ENUMERATED {
                                                       dB-6, dB-4, dB-2, dB0}
            }
        }                                                               OPTIONAL    -- Need OP
    },
    cellReselectionServingFreqInfo     SEQUENCE {
        s-NonIntraSearch                   ReselectionThreshold         OPTIONAL,   -- Need OP
        threshServingLow                   ReselectionThreshold,
        cellReselectionPriority            CellReselectionPriority
    },
    intraFreqCellReselectionInfo       SEQUENCE {
        q-RxLevMin                         Q-RxLevMin,
        p-Max                              P-Max                        OPTIONAL,   -- Need OP
        s-IntraSearch                      ReselectionThreshold         OPTIONAL,   -- Need OP
        allowedMeasBandwidth               AllowedMeasBandwidth         OPTIONAL,   -- Need OP
        presenceAntennaPort1               PresenceAntennaPort1,
        neighCellConfig                    NeighCellConfig,
        t-ReselectionEUTRA                 T-Reselection,
        t-ReselectionEUTRA-SF              SpeedStateScaleFactors       OPTIONAL    -- Need OP
    },
    ...,
    lateNonCriticalExtension           OCTET STRING (CONTAINING
 intraFreqCellReselectionInfo-v9xy-IEs)    OPTIONAL,-- Need OP
    [[  s-IntraSearch-v920                SEQUENCE {
            s-IntraSearchP-r9                  ReselectionThreshold,
            s-IntraSearchQ-r9                  ReselectionThresholdQ-r9
        }                                                               OPTIONAL,   -- Need OP
        s-NonIntraSearch-v920              SEQUENCE {
            s-NonIntraSearchP-r9               ReselectionThreshold,
            s-NonIntraSearchQ-r9               ReselectionThresholdQ-r9
        }                                                               OPTIONAL,   -- Need OP
        q-QualMin-r9                       Q-QualMin-r9                 OPTIONAL,   -- Need OP
        threshServingLowQ-r9               ReselectionThresholdQ-r9     OPTIONAL    -- Need OP
    ]]
}

IntraFreqCellReselectionInfo-v9xy-IEs ::=          SEQUENCE {
    multiMPR-InfoList-r9               SEQUENCE (SIZE (1..maxA-MPRs-r9)) OF MPR-Info-r9  OPTIONAL
    -- Need OR
}

MPR-Info-r9 ::=      SEQUENCE {
    additionalSpectrumEmission         AdditionalSpectrumEmission,
    p-Max                              P-Max                            OPTIONAL,   -- Need OP
}

-- ASN1STOP
```

FIG.17

| SystemInformationBlockType3 field descriptions |
|---|
| *cellReselectionInfoCommon*<br>Cell re-selection information common for cells. |
| *multiMPR-InfoList*<br>A list of *additionalSpectrumEmission* and the associated Pmax in the order of priority. If p-Max is absent in the MPR-Info, the UE shall consider the *P-Max* in the *intraFreqCellReselectionInfo* (without suffix) applicable. If the UE does not support any of the *additionalSpectrumEmission* in the list, the UE shall consider the *P-Max* in the *intraFreqCellReselectionInfo* (without suffix) applicable. |
| *q-Hyst*<br>Parameter $Q_{hyst}$ in 36.304 [4], Value in dB. Value dB1 corresponds to 1 dB, dB2 corresponds to 2 dB and so on. |
| *speedStateReselectionPars*<br>Speed dependent reselection parameters, see TS 36.304 [4]. If this field is absent, i.e, *mobilityStateParameters* is also not present, UE behaviour is specified in TS 36.304 [4]. |
| *q-HystSF*<br>Parameter "Speed dependent ScalingFactor for $Q_{hyst}$" in TS 36.304 [4]. The sf-Medium and sf-High concern the additional hysteresis to be applied, in Medium and High Mobility state respectively, to $Q_{hyst}$ as defined in TS 36.304 [4]. In dB. Value dB-6 corresponds to -6dB, dB-4 corresponds to -4dB and so on. |
| *t-ReselectionEUTRA*<br>Parameter "Treselection$_{EUTRA}$" in TS 36.304 [4]. |
| *t-ReselectionEUTRA-SF*<br>Parameter "Speed dependent ScalingFactor for Treselection$_{EUTRA}$" in TS 36.304 [4]. If the field is not present, the UE behaviour is specified in TS 36.304 [4]. |
| *q-RxLevMin*<br>Parameter "$Q_{rxlevmin}$" in TS 36.304 [4], applicable for intra-frequency neighbour cells. |
| *s-IntraSearch*<br>Parameter "$S_{IntraSearchP}$" in TS 36.304 [4]. If the field *s-IntraSearchP* is present, the UE applies the value of *s-IntraSearchP* instead. Otherwise if neither *s-IntraSearch* nor *s-IntraSearchP* is present, the UE applies the (default) value of infinity for $S_{IntraSearchP}$. |
| *cellReselectionServingFreqInfo*<br>Information common for Cell re-selection to inter-frequency and inter-RAT cells. |
| *s-NonIntraSearch*<br>Parameter "$S_{nonIntraSearchP}$" in TS 36.304 [4]. If the field *s-NonIntraSearchP* is present, the UE applies the value of *s-NonIntraSearchP* instead. Otherwise if neither *s-NonIntraSearch* nor *s-NonIntraSearchP* is present, the UE applies the (default) value of infinity for $S_{nonIntraSearchP}$. |
| *threshServingLow*<br>Parameter "Thresh$_{Serving, LowP}$" in TS 36.304 [4]. |
| *intraFreqcellReselectionInfo*<br>Cell re-selection information common for intra-frequency cells. |
| *p-Max*<br>Value applicable for the intra-frequency neighbouring E-UTRA cells. If absent the UE applies the maximum power according to the UE capability. |
| *allowedMeasBandwidth*<br>If absent, the value corresponding to the downlink bandwidth indicated by the *dl-Bandwidth* included in *MasterInformationBlock* applies. |
| *s-IntraSearchP*<br>Parameter "$S_{IntraSearchP}$" in TS 36.304 [4]. See descriptions under *s-IntraSearch*. |
| *s-IntraSearchQ*<br>Parameter "$S_{IntraSearchQ}$" in TS 36.304 [4]. If the field is not present, the UE applies the (default) value of 0 dB for $S_{IntraSearchQ}$. |
| *s-NonIntraSearchP*<br>Parameter "$S_{nonIntraSearchP}$" in TS 36.304 [4]. See descriptions under *s-NonIntraSearch*. |
| *s-NonIntraSearchQ*<br>Parameter "$S_{nonIntraSearchQ}$" in TS 36.304 [4]. If the field is not present, the UE applies the (default) value of 0 dB for $S_{nonIntraSearchQ}$. |
| *q-QualMin*<br>Parameter "$Q_{qualmin}$" in TS 36.304 [4], applicable for intra-frequency neighrbour cells. If the field is not present, the UE applies the (default) value of negative infinity for $Q_{qualmin}$. |
| *threshServingLowQ*<br>Parameter "Thresh$_{Serving, LowQ}$" in TS 36.304 [4]. |

FIG.18

```
                    SystemInformationBlockType3 information element
-- ASN1START SystemInformationBlockType3 ::=    SEQUENCE {
     cellReselectionInfoCommon         SEQUENCE {
        q-Hyst                             ENUMERATED {
                                              dB0, dB1, dB2, dB3, dB4, dB5, dB6, dB8, dB10,
                                              dB12, dB14, dB16, dB18, dB20, dB22, dB24},
        speedStateReselectionPars          SEQUENCE {
```
```
    ...,
    lateNonCriticalExtension          OCTET STRING              OPTIONAL, -- Need OP
    [[  s-IntraSearch-v920            SEQUENCE {
            s-IntraSearchP-r9            ReselectionThreshold,
            s-IntraSearchQ-r9            ReselectionThresholdQ-r9
        }                                                         OPTIONAL,    -- Need OP
        s-NonIntraSearch-v920         SEQUENCE {
            s-NonIntraSearchP-r9         ReselectionThreshold,
            s-NonIntraSearchQ-r9         ReselectionThresholdQ-r9
        }                                                         OPTIONAL,    -- Need OP
        q-QualMin-r9                  Q-QualMin-r9                OPTIONAL,    -- Need OP
        threshServingLowQ-r9          ReselectionThresholdQ-r9    OPTIONAL     -- Need OP
    ]]
}

SystemInformationBlockType3-v9xx-IEs  ::=     SEQUENCE {
    multiBandInfoListP-max           SEQUENCE (SIZE (1..maxMultiBands)) OF P-maxNS-value
OPTIONAL,-- Need OR
    nonCriticalExtension             SEQUENCE {}                          OPTIONAL -- Need OP
}

P-maxPerNS-value ::=                 SEQUENCE {
    p-maxNew                         P-max           OPTIONAL,     -- Need OP
    additionalSpectrumEmission       AdditionalSpectrumEmission,
    q-RxLevMin-PmaxNew               Q-RxLevMin                    -- Need OP
}

-- ASN1STOP
```

FIG.19

| SystemInformationBlockType3 field descriptions |
|---|
| *q-RxLevMin*<br>Parameter "$Q_{rxlevmin}$" in TS 36.304 [4], applicable for intra-frequency neighbour cells. |
| *multiBandInfoListP-max*<br>A list of P-max and NS-values values for the band. There is *P-maxNS-value* for each additional frequency band included in *multiBandInfoList*, listed in the same order.<br><br>The UE shall apply the first additional spectrum emission in the list that it supports, and use the corresponding p-MaxNew and *q-RxLevMin-PmaxNew* for cell selection. If none of the additional spectrum emission values in the list are supported, the UE shall use *p-Max and q-RxLevMin* for cell selection. |
| *p-Max*<br>Value applicable for the intra-frequency neighbouring E-UTRA cells. If absent the UE applies the maximum power according to the UE capability. |

5.2.2.10 Actions upon reception of *SystemInformationBlockType3*

~~No UE requirements related to the contents of this *SystemInformationBlock* apply other than those specified elsewhere e.g. within procedures using the concerned system information, and/ or within the corresponding field descriptions.~~
Upon receiving *SystemInformationBlockType3*, the UE shall:

1> if the UE applied the *additionalPmax* included in *NS-PmaxList* within *freqBandInfo* or *multiBandInfoList-v10j0* in *SystemInformationBlockType1* according to 5.2.2.7:

2> replace *p-Max* if present in *SystemInformationBlockType3* with the *additionalPmax*;

FIG.21

```
                    SystemInformationBlockType1 message

-- ASN1START

SystemInformationBlockType1 ::=      SEQUENCE {
     cellAccessRelatedInfo           SEQUENCE {
```
...
```
     systemInfoValueTag              INTEGER (0..31),
     nonCriticalExtension            SystemInformationBlockType1-v890-IEs
     OPTIONAL
}

SystemInformationBlockType1-v890-IEs::= SEQUENCE {
     lateNonCriticalExtension        OCTET STRING (CONTAINING SystemInformationBlockType1-v8h0-
IEs)          OPTIONAL,       -- Need OP
     nonCriticalExtension            SystemInformationBlockType1-v920-IEs    OPTIONAL
}

-- Late non critical extensions
SystemInformationBlockType1-v8h0-IEs ::=    SEQUENCE {
     multiBandInfoList               MultiBandInfoList       OPTIONAL,     -- Need OR
     nonCriticalExtension            SystemInformationBlockType1-v9e0-IEs    OPTIONAL -- Need
OP
}

SystemInformationBlockType1-v9e0-IEs ::= SEQUENCE {
     freqBandIndicator-v9e0          FreqBandIndicator-v9e0      OPTIONAL,   -- Cond FBI-max
     multiBandInfoList-v9e0          MultiBandInfoList-v9e0      OPTIONAL,   -- Cond mFBI-max
     nonCriticalExtension            SystemInformationBlockType1-v10j0-IEsSEQUENCE {}
         OPTIONAL -- Need OP
}

SystemInformationBlockType1-v10j0-IEs ::= SEQUENCE {
     freqBandInfo-r10                NS-PmaxList-r10             OPTIONAL,   -- Need OR
     multiBandInfoList-v10j0         MultiBandInfoList-v10j0     OPTIONAL,   -- Need OR
     nonCriticalExtension            SEQUENCE {}                 OPTIONAL
}

-- Regular non critical extensions
SystemInformationBlockType1-v920-IEs ::=     SEQUENCE {
     ims-EmergencySupport-r9         ENUMERATED {true}           OPTIONAL,   -- Need OR
     cellSelectionInfo-v920          CellSelectionInfo-v920      OPTIONAL,   -- Cond RSRQ
     nonCriticalExtension            SEQUENCE {}                 OPTIONAL    -- Need OP
}

PLMN-IdentityList ::=                SEQUENCE (SIZE (1..6)) OF PLMN-IdentityInfo
```

FIG.22

| SystemInformationBlockType1 field descriptions |
|---|
| *freqBandInfo*<br>A list of *additionalPmax* and *additionalSpectrumEmission* values as defined in TS 36.101 [42, table 6.2.4-1] for the frequency band in *freqBandIndicator*. |
| *multiBandInfoList-v10j0*<br>A list of *additionalPmax* and *additionalSpectrumEmission* values as defined in TS 36.101 [42, table 6.2.4-1] for the frequency bands in *multiBandInfoList* (i.e. without suffix) and *multiBandInfoList-v9e0*. If E-UTRAN includes *multiBandInfoList-v10j0*, it includes the same number of entries, and listed in the same order, as in *multiBandInfoList* (i.e. without suffix). |

**5.2.2.7     Actions upon reception of the *SystemInformationBlockType1* message**

Upon receiving the *SystemInformationBlockType1* message the UE shall:

1> if in RRC_CONNECTED while T311 is not running, and the UE supports multi-band cells as defined by bit 31 in *featureGroupIndicators*:

2> disregard the *freqBandIndicator* and *multiBandInfoList*, if received, while in RRC_CONNECTED;

2> forward the *cellIdentity* to upper layers;

2> forward the *trackingAreaCode* to upper layers;

1> else

2> if the frequency band indicated in the *freqBandIndicator* is part of the frequency bands supported by the UE; or 2> if the UE supports *multiBandInfoList*, and if one or more of the frequency bands indicated in the *multiBandInfoList* are part of the frequency bands supported by the UE:

3> forward the *cellIdentity* to upper layers;

3> forward the *trackingAreaCode* to upper layers;

<u>3> if, for the frequency band selected by the UE (from *freqBandIndicator* or *multiBandInfoList*), the *freqBandInfo* or the *multiBandInfoList-v10j0* is present and the UE capable of *multiNS-Pmax* supports at least one *additionalSpectrumEmission* in the *NS-PmaxList* within *freqBandInfo* or *multiBandInfoList-v10j0*:</u>

<u>4> apply the first listed *additionalSpectrumEmission* which it supports among the values included in *NS-PmaxList* within *freqBandInfo* or *multiBandInfoList-v10j0*;</u>

<u>4> if the *additionalPmax* is present in the same entry of the selected *additionalSpectrumEmission* within *NS-PmaxList*:</u>

<u>5> apply the *additionalPmax*;</u>

<u>4> else:</u>

<u>5> apply the *p-Max*;</u>

<u>3> else:</u>

<u>4> apply the *additionalSpectrumEmission* in *SystemInformationBlockType2* and the *p-Max*;</u>

2> else:

3> consider the cell as barred in accordance with TS 36.304 [4] and;

3> perform barring as if *intraFreqReselection* is set to *notAllowed*, and as if the *csg-Indication* is set to *FALSE*;

USER EQUIPMENT, MOBILE COMMUNICATION SYSTEM, AND CELL SELECTION METHOD

TECHNICAL FIELD

The present invention relates to a cell selection technique which is performed by a user equipment in a mobile communication system.

BACKGROUND ART

In the standard of long term evolution (LTE), out-of-band radiation regulations or the like are provided not to interfere with a radio system which is used in the same region. In general, these regulations are prescribed in domestic laws of countries and communication common carriers are requested to operate radio systems based on the standard.

On the other hand, depending on band usages or system types thereof, a case in which sufficient attenuation is not acquired for an allowable interference level with respect to a neighboring system is assumed.

Particularly, in the LTE, since broadband transmission is carried out and spurious noise is likely to reach a farther separated frequency with a high level, it may not be realistic to satisfy the regulations in suppression by an analog device such as a duplexer.

In order to cope with this case, in the LTE scheme, it is prescribed that transmission power of a user equipment UE may be reduced depending on transmission positions of resource blocks (RBs) or the number of RBs. Here, a maximum reduction in allowable transmission power is defined as an "additional-maximum power reduction (A-MPR)" (see Non-Patent Document 1).

Since a radio system to be protected does not always exist in every country and every regions, application of the A-MPR is permitted when a specific signal "network signaling value (hereinafter referred to as an NS value)" is broadcasted from an NW (a base station eNB).

The NS value in the related art is a value which is broadcasted by additional spectrum emission of system information block type 2 (SIB2) (see Non-Patent Document 2). An example of NS values and transmission conditions (requirements, band, bandwidth, number of RBs, allowable A-MPR value) corresponding thereto is illustrated in FIG. 1 (extracted from Table 6.2.4-1 in Non-Patent Document 1). More specifically, the "transmission conditions" are "additional spectrum emission mask and additional spurious emissions requirements."

For example, when a user equipment UE which is served in a certain cell and which has received NS_05 from a base station eNB uses the number of RBs or the like corresponding to NS_05 in FIG. 1, A-MPR of 1 dB or less is permitted for the transmission power defined in "6.6.3.3.1 Minimum requirement (network signalled value "NS_05")" in Non-Patent Document 1.

The NS value is defined if necessary for each operating band and for each channel bandwidth.

Here, an operation of a user equipment when an NS value which is not defined for all channel bandwidths of bands used by the user equipment UE or a specific channel bandwidth of the bands is received is not defined, but the user equipment UE can understand NS_01 (no A-MPR) as a default in an arbitrary band and an arbitrary channel bandwidth.

Even when a regulation is newly added after standardization of a certain band or a specific band is suddenly used as a specific protection standard in another country and an NS value and/or an application condition of a relevant A-MPR is newly defined, a user equipment UE which has been sold in advance cannot understand the new NS value (unexpected NS) and thus there is a possibility that an operation after reception of the new NS value is not clear (there is a possibility that the regulation will not be satisfied or the user equipment will not be camped on the corresponding cell).

Regarding the above-mentioned problem, it has been proposed that a base station eNB broadcasts a plurality of NS values and a user equipment UE receiving the plurality of NS values applies an allowable NS value having a highest priority among the plurality of NS values (see Non-Patent Document 3 and Non-Patent Document 4). In the non-patent documents, it has been proposed to broadcast Pmax (maximum transmission power of UE) corresponding to each NS value together. In this case, the user equipment UE uses Pmax corresponding to the NS value to be applied. This method is referred to as "multiple Pmax/NS."

CITATION LIST

Non-Patent Document

Non-Patent Document 1: 3GPP TS 36.101 V12.8.0 (2015-July)

Non-Patent Document 2: 3GPP TS 36.331 V12.6.0 (2015-June)

Non-Patent Document 3: 3GPP TSG-RAN WG2 Meeting #91 R2-153460

Non-Patent Document 4: 3GPP TSG-RAN WG2 Meeting #91 R2-153468

Non-Patent Document 5: 3GPP TS 36.304 V12.5.0 (2015-June)

SUMMARY OF THE INVENTION

Problem to be Solved by the Invention

In the multiple Pmax/NS, for example, a base station eNB broadcasts NS_01 in which A-MPR is not permitted and NS_50 in which A-MPR is permitted. At this time, in a user equipment UE employing NS_01 (which is referred to as an "old UE" for the purpose of convenience), A-MPR is not permitted and thus it is considered that a low value is set as the maximum transmission power to suppress uplink interference. In a user equipment UE employing NS_50 (which is referred to as a "new UE"), A-MPR is permitted and thus it is considered that a high value may be set as the maximum transmission power.

Therefore, for example, it is assumed that the base station eNB broadcasts 17 dBm as Pmax for NS_01 and broadcasts 23 dBm as Pmax for NS_50. These numerical values are an example. Pmax for NS_01 may be the existing p-Max.

In cell selection in which a user equipment UE selects a serving cell, the cell needs to satisfy at least "Srxlev>0" in "cell selection criterion S" (Non-Patent Document 5: 5.2.3.2 Cell Selection Criterion). Srxlev is calculated by the following equation.

$$\text{Srxlev} = Q_{rxlevmeas} - (Q_{rxlevmin} + Q_{rxlevminoffset}) - P_{compensation} - Q\text{offset}_{temp}$$

Meanings of parameters are the same as described in Non-Patent Document 5. Particularly, denotes a Qrxievmin minimum reception level (reception power) required for the cell and is a value required as a value q-RxLevMin×2 of broadcast information (SIB1). Here, $Q_{rxlevminoffset}$, Pcompensation, and $Qoffset_{temp}$ are assumed to be 0.

For example, $Q_{rxlevmin}$ is assumed to be −125 dBm. This value is, for example, a value which is set to form a coverage in which an uplink signal of the old UE (Pmax=17 dBm) arrives. That is, $Q_{rxievmin}$ is a value for 17 dBm. The coverage at this time is indicated by B in FIG. 2.

On the other hand, since a new UE can perform transmission with transmission power of maximum 23 dBm, an area of the coverage can be enlarged in comparison with the old UE, as indicated by A in FIG. 2, from the point of view of the transmission power. However, the same $Q_{rxievmin}$ is set for the old UE and the new UE on the basis of the broadcast information. Accordingly, for example, when the new UE is located at a position of C in FIG. 2, the new UE does not satisfy Srxlev>0 and is out of the coverage. That is, for both the new UE and the old UE, the coverage is the same as indicated by B in FIG. 2.

In this way, the new UE can originally perform communication in a wider coverage but cannot help performing communication in a narrower coverage. Accordingly, there is a possibility of a decrease in performance of the whole system being caused due to an increase in handover. Since cell reselection uses the same condition determination as the condition determination in the cell selection, the same problem may be caused in the cell reselection.

The invention is made in consideration of the above-mentioned circumstances and an object thereof is to provide a technique for enabling a user equipment to appropriately perform cell selection or cell reselection in a mobile communication system in which a plurality of signaling values and maximum transmission power values corresponding to the signaling values are transmitted from a base station.

Means for Solving Problem

According to an embodiment of the invention, there is provided a user equipment in a mobile communication system including a base station and the user equipment, the user equipment including: selection means configured to receive a plurality of signaling values and a plurality of maximum transmission power values corresponding to the plurality of signaling values respectively from the base station, to select one signaling value of the plurality of signaling values, and to select the maximum transmission power value corresponding to the selected signaling value; and control means configured to perform cell selection or cell reselection by determining whether a reception level value in a cell to be determined satisfies a predetermined condition using a correction value, which is obtained by subtracting a compensation value based on the maximum transmission power value from a minimum reception level value predetermined for the cell to be determined in the cell selection or cell reselection, and the reception level value measured for the cell to be determined.

According to an embodiment of the invention, there is provided a mobile communication system including a base station and a user equipment, wherein the base station includes means configured to transmit a plurality of signaling values and a plurality of maximum transmission power values corresponding to the plurality of signaling values, and the user equipment includes: selection means configured to receive the plurality of signaling values and the plurality of maximum transmission power values corresponding to the plurality of signaling values from the base station, to select one signaling value of the plurality of signaling values, and to select the maximum transmission power value corresponding to the selected signaling value; and control means configured to perform cell selection or cell reselection by determining whether a reception level value in a cell to be determined satisfies a predetermined condition using a correction value, which is obtained by subtracting a compensation value based on the maximum transmission power value from a minimum reception level value predetermined for the cell to be determined in the cell selection or cell reselection, and the reception level value measured for the cell to be determined.

According to an embodiment of the invention, there is provided a cell selection method which is performed by a user equipment in a mobile communication system including a base station and the user equipment, the cell selection method including: receiving a plurality of signaling values and a plurality of maximum transmission power values corresponding to the plurality of signaling values from the base station, selecting one signaling value of the plurality of signaling values, and selecting the maximum transmission power value corresponding to the selected signaling value; and performing cell selection or cell reselection by determining whether a reception level value in a cell to be determined satisfies a predetermined condition using a correction value, which is obtained by subtracting a compensation value based on the maximum transmission power value from a minimum reception level value predetermined for the cell to be determined in the cell selection or cell reselection, and the reception level value measured for the cell to be determined.

Effect of the InventionEFFECT OF THE INVENTION

According to the embodiments of the invention, it is possible to provide a technique for enabling a user equipment to appropriately perform cell selection or cell reselection in a mobile communication system in which a plurality of signaling values and maximum transmission power values corresponding to the signaling values are transmitted from a base station.

BRIEF DESCRIPTION OF DRAWINGS

FIG. 1 is a diagram illustrating an example of A-MPR;

FIG. 4 is a diagram illustrating an example of a modified specification of an SIB1 message;

FIG. 5 is a diagram illustrating an example of a modified specification of the SIB1 message;

FIG. 6 is a diagram illustrating an example of a processing sequence according to the embodiment;

FIG. 7 is a diagram illustrating an example of a modified specification of "cell selection criterion";

FIG. 9 is a diagram illustrating an example of a modified specification of "cell selection criterion" when Equations (1) and (3) are used;

FIG. 10 is a diagram illustrating an example of a modified specification of the SIB1 message;

FIG. 11 is a diagram illustrating an example of a modified specification of the SIB1 message;

FIG. 12 is a diagram illustrating an example of a modified specification of an SIB5 message;

FIG. 13 is a diagram illustrating an example of a modified specification of the SIB5 message;

FIG. 14 is a diagram illustrating an example of a modified specification of the SIB5 message;

FIG. 15 is a diagram illustrating an example of a modified specification of the SIB5 message;

FIG. 16 is a diagram illustrating an example of a modified specification of an SIB3 message;

FIG. 17 is a diagram illustrating an example of a modified specification of the SIB3 message;

FIG. 18 is a diagram illustrating an example of a modified specification of the SIB3 message;

FIG. 19 is a diagram illustrating an example of a modified specification of the SIB3 message;

FIG. 20 is a diagram illustrating an example of a modified specification relevant to a UE operation when the SIB3 message is received;

FIG. 21 is a diagram illustrating an example of a modified specification of the SIB1 message corresponding to FIG. 20;

FIG. 22 is a diagram illustrating an example of a modified specification of the SIB1 message corresponding to FIG. 20;

FIG. 23 is a diagram illustrating an example of a modified specification relevant to a UE operation when the SIB1 message illustrated in FIG. 21 is received;

MODES FOR CARRYING OUT THE INVENTION

Hereinafter, embodiments of the invention will be described with reference to the accompanying drawings. The embodiments described below are only an example and an embodiment of the invention is not limited to the following embodiments. In the embodiments, the invention is applied to an LTE mobile communication system, but the invention is not limited to the LTE and can be applied to other mobile communication systems. In the specification and the appended claims, "LTE" is used in meanings including Rel schemes of Rel-8 and subsequent thereto in 3GPP (which includes 5G herein).

In the following description, maximum transmission power corresponding to a plurality of NS values is referred to as PmaxNew, and existing p-Max (common maximum transmission power not corresponding to any of a plurality of NS values) is referred to as Pmax.

Hereinafter, the technique for solving the above-mentioned problem will be described in a first embodiment, a second embodiment, and modified examples.

First Embodiment

<Whole System Configuration>

Figure 3:
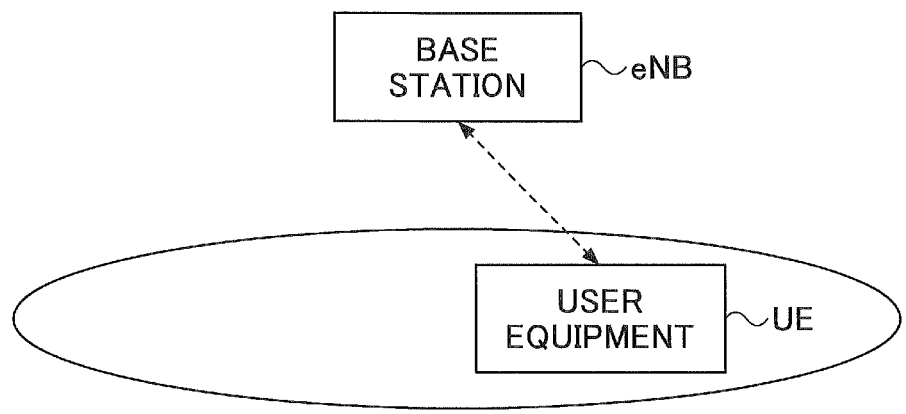
FIG. 3 is a diagram illustrating a configuration of a communication system according to an embodiment of the invention.

FIG. 3 illustrates a configuration diagram (which is common to first and second embodiments and the modified examples) of a communication system according to an embodiment of the invention. As illustrated in FIG. 3, the communication system according to this embodiment includes a base station eNB and a user equipment UE. One base station eNB and one user equipment UE are illustrated in FIG. 3, but this configuration is only an example. A plurality of base stations may be present or a plurality of user equipments may be present.

In this embodiment, the base station eNB has a function of broadcasting a plurality of NS values and maximum transmission power (PmaxNew) corresponding to each NS value using system information (for example, SIB1). For example, the base station eNB transmits a list in which a plurality of NS values are arranged in a decreasing order of priorities using SIB2 and transmits a list of PmaxNew corresponding to each NS value in the list using SIB1. The base station eNB may transmit a list of sets including a plurality of NS values and a plurality of PmaxNew corresponding thereto using SIB1.

The user equipment UE receiving the list selects an NS value having a highest priority from NS values usable by the user equipment UE in a usable operating band or in a usable operating band and DL channel bandwidth among the plurality of NS values which has been broadcast, and selects PmaxNew corresponding to the selected NS value.

For example, the base station eNB transmits NS_50, NS_03, and NS_01 (a decreasing order of priorities) and PmaxNew1, PmaxNew2, and PmaxNew3 as PmaxNew corresponding to NS_50, NS_03, and NS_01 respectively for an operating band which is used by the user equipment UE. When the user equipment UE uses NS_50, the user equipment UE selects and uses PmaxNew1 corresponding to NS_50. Existing p-Max (Pmax) may be used as PmaxNew corresponding to the NS value (NS_01) having a lowest priority.

A description example (an extract) of a 3GPP specification (3GPP TS 36.331) for realizing broadcasting of the NS values and PmaxNew is illustrated in FIGS. 4 and 5 in the form in which changed parts in Non-Patent Document 2 are underlined. The example illustrated herein is described in Non-Patent Document 4.

As illustrated in FIGS. 4 and 5, in this example, the base station eNB transmits a list of NS values and PmaxNew for each band using SIB1. The user equipment UE receiving the SIB1 selects a first (highest-priority) NS value (an additional spectrum emission value) which is supported by the user equipment UE from the list of NS values corresponding to a selected band (for example, a band indicated by freqBandIndicator), and selects PmaxNew corresponding to the selected NS value. When no NS value usable by the user equipment UE is present in the list, the user equipment UE uses the existing p-Max (Pmax).

<Example of Sequence>

An example of operations in cell selection in an RRC idle state will be described below as an example of operations of the communication system according to this embodiment with reference to the sequence diagram illustrated in FIG. 6. In the cell selection, measurement and determination of reception quality (RSRQ) may be performed, but in this example, measurement and determination of reception power (RSRP) will be mainly described. The reception power may be referred to as a reception level.

In the example illustrated in FIG. 6, a user equipment UE receives a synchronization signal (PSS/SSS) from a base station eNB by cell search (Step S101) to take synchronization and to acquire a cell ID (PCI). As for the cell synchronized by the synchronization signal, the user equipment UE receives a reference signal (CRS) transmitted from the base station eNB and measures reception power (RSRP) (Step S102). Here, it is assumed that the reception power (RSRP) of a plurality of cells is measured.

The user equipment UE selects a cell of the base station eNB (illustrated in FIG. 6) as a cell in which the RSRP of the reference signal is the highest (a best cell).

In Step S103, the user equipment UE receives system information (such as MIB and SIB1) broadcast from the base station eNB. For example, as illustrated in FIGS. 4 and 5, the SIB1 includes a list of NS values and PmaxNew and Pmax for each band.

In Step S104, the user equipment UE selects an NS value in the band usable by the user equipment and selects PmaxNew corresponding to the selected NS value.

The user equipment UE determines a DL channel bandwidth usable by the user equipment in the cell using DL bandwidth information included in MIB. The user equipment UE determines an operating band usable by the user equipment in the cell using the band information included in SIB1. A UL channel bandwidth is considered to be the same as for DL, unless SIB2 includes UL bandwidth information. When SIB2 includes UL bandwidth information, a value broadcast using SIB2 is determined to be the UL channel bandwidth which is used in the cell.

In Step S105, determination based on "cell selection criterion S" is performed. In this example, "cell selection criterion S" is satisfied and the cell is selected.

In order to solve the problem described above with reference to FIG. 2, in this embodiment, "$P_{EMAX}$compensation" which is a value obtained by subtracting Pmax from PmaxNew is added to a measured value in calculation of Srxlev when determining whether "Srxlev>0" is satisfied. In other words, Srxlev is calculated by subtracting "$P_{EMAX}$compensation" from a predetermined minimum reception level value ($Q_{rxlevmin}$) and considering the subtracted minimum reception level value as a new minimum reception level value. More specifically, the calculation is performed as follows.

A description example (an extract) of a 3GPP specification (3GPP TS 36.331) when the calculation of Srxlev in this embodiment is used is illustrated in FIG. 7 in the form in which changed parts in Non-Patent Document 5 are underlined.

As illustrated in FIG. 7, Srxlev is calculated by the following equation.

$$Srxlev = Q_{fxlevmeas} - (Q_{rxlevmin} + Q_{rxlevminoffset}) - Pcompensation - Qoffset_{temp} + P_{EMAX}compensation$$

$Q_{rxlevmeas}$ denotes a measured value of a reception level, $Q_{rxlevmin}$ and $Q_{rxlevminoffset}$ are parameters which are broadcasted using system information (for example, SIB1). $Qoffset_{temp}$ is a parameter (connEstFailOffset) which is used when a timer (T300) expires, and may not be considered (may be set to 0) in this embodiment. Pcompensation is "$max(P_{EMAX} - P_{PowerClass}, 0)$" and PmaxNew can be used as $P_{EMAX}$ therein. In this example (in which large PmaxNew is 23 dB), Pcompensation may be considered to be 0. Here, even when any one of PmaxNew and Pmax is used as the $P_{EMAX}$, it is assumed that "$max(P_{EMAX} - P_{PowerClass}, 0)$" is 0. That is, it is assumed that both of PmaxNew and Pmax are equal to $P_{PowerClass}$ (a maximum transmission power based on the power class of UE) or less than $P_{PowerClass}$.

"$(Q_{rxlevmin} + Q_{rxlevminoffset}) + P_{compensation} + Qoffset_{temp}$" as a whole may be referred to as a predetermined minimum reception level value.

Accordingly, in this example, it can be considered that Srxlev is calculated using the following equation for the purpose of convenience.

$$Srxlev = measured\ value(Q_{rxlevmeas}) - (constant (Q_{rxlevmin}) - P_{EMAX}compensation)$$

More specifically, $P_{EMAX}$compensation is calculated by "Max(PmaxNew−Pmax, 0)" as illustrated in FIG. 7. Max(A, B) is a function for returning the larger value of A and B. As described above, PmaxNew denotes the maximum transmission power usable by the user equipment UE in the cell and Pmax is a value of the existing p-Max. For example, $P_{EMAX}$compensation is calculated by "Max(PmaxNew−Pmax, 0)." For example, a value obtained by subtracting a predetermined value other than Pmax from PmaxNew may be used as $P_{EMAX}$compensation. By using a method other than these, $P_{EMAX}$compensation may be calculated on the basis of PmaxNew. PmaxNew corresponding to the NS value having a lowest priority may be used as "Pmax" in "PmaxNew−Pmax."

Figure 2:
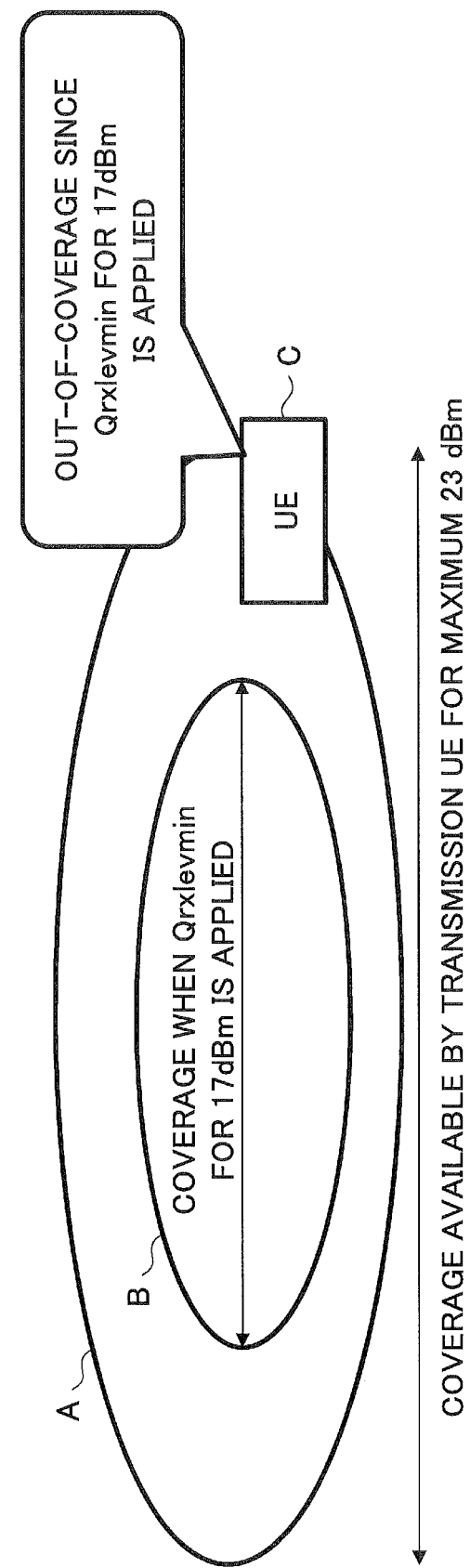
FIG. 2 is a diagram illustrating a problem.

Here, when PmaxNew=23 dBm and Pmax=17 dBm are set as in the example illustrated in FIG. 2, $P_{EMAX}$compensation=6 dB is obtained. When the constant (the predetermined minimum reception level value) is set to −125 dBm, "constant−$P_{EMAX}$compensation" is −131 dBm. Accordingly, when $P_{EMAX}$compensation is used, the measured value ($Q_{rxlevmeas}$) for satisfying Srxlev>0 is less and the coverage in the user equipment UE is wider in comparison with a case in which $P_{EMAX}$compensation is not used.

Figure 8:
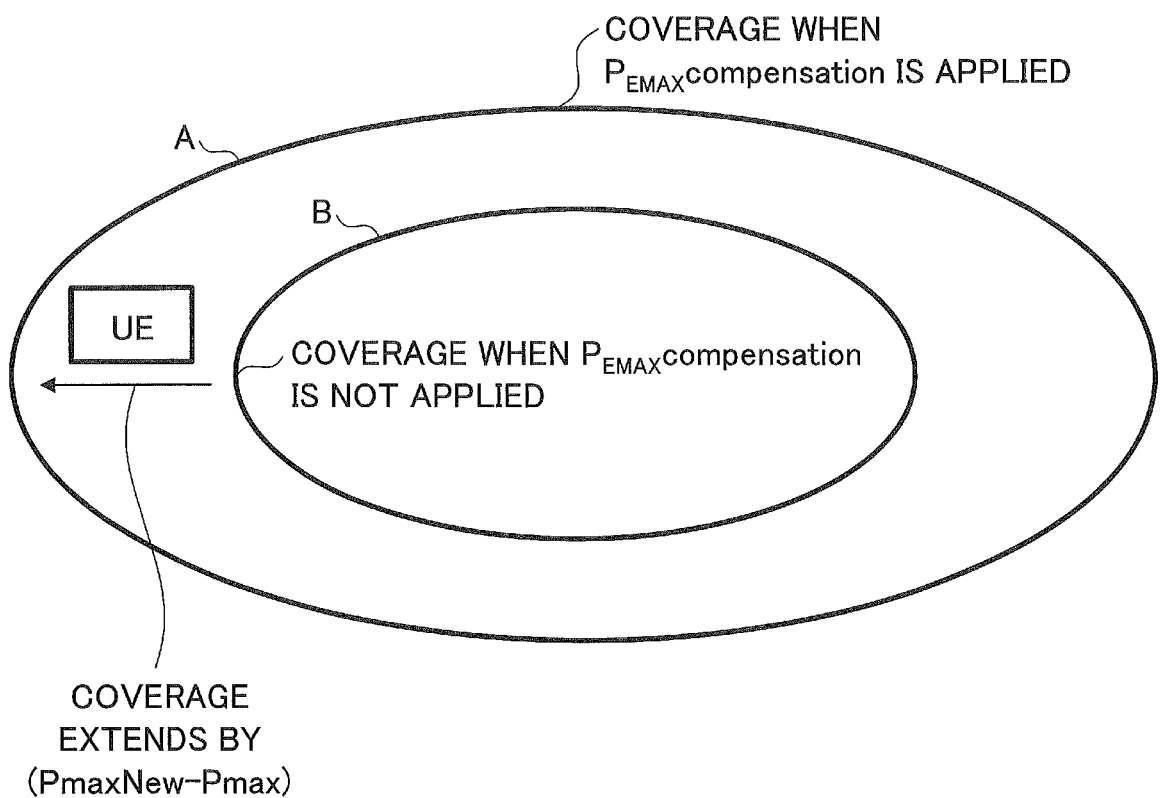
FIG. 8 is a diagram illustrating an effect of application of $P_{EMAXcompensation}$.

That is, as illustrated in FIG. 8, the coverage when $P_{EMAX}$compensation is not used is B, but the coverage is widened by "PmaxNew-Pmax" and the coverage indicated by A is obtained when $P_{EMAX}$compensation is used.

As described above, in the above-mentioned example, the following equation is used on the assumption that both of PmaxNew and Pmax are equal to $P_{PowerClass}$ or less than $P_{PowerClass}$.

$$Srxlev = Q_{rxlevmeas} - (Q_{rxlevmin} + Q_{rxlevminoffset}) - Pcompensation - Qoffset_{temp} + P_{EMAX}compensation$$

As expressed by Equation (1), the user equipment UE may calculate Srxlev using an existing equation, unlike the above-mentioned example. In this case, Pcompensation is calculated as expressed by Equation (2).

$$Srxlev = Q_{rxlevmeas} - (Q_{rxlevmin} + Q_{rxlevminoffset}) - Pcompensation - Qoffset_{temp} \quad (1)$$

$$Pcompensation = max(P\_EMAX[legacy] - P_{PowerClass}, 0) - max\{min(P\_EMAX[new], P_{PowerClass}) - P\_EMAX[legacy], 0\}(dB) \quad (2)$$

In Equation (2), P_EMAX[legacy] corresponds to Pmax (existing p-Max) and P_EMAX[new] corresponds to PmaxNew.

When Equations (1) and (2) are used, this embodiment is not limited to the assumption that both of PmaxNew and Pmax are equal to $P_{PowerClass}$ or less than $P_{PowerClass}$. What Equation (2) becomes depending on a magnitude relationship of P_EMAX[legacy], P_EMAX[new], and $P_{PowerClass}$ will be described below.

(a) P_EMAX[legacy]>$P_{PowerClass}$ and P_EMAX[new]>$P_{PowerClass}$

In this case, Pcompensation=(P_EMAX[legacy]−$P_{PowerClass}$)−max{$P_{PowerClass}$−P_EMAX[legacy], 0}= (P_EMAX[legacy]−$P_{PowerClass}$) is obtained. That is, when P_EMAX[legacy]>$P_{PowerClass}$ is satisfied, the maximum transmission power of the user equipment UE is limited to $P_{PowerClass}$ and thus compensation corresponding thereto (compensation for narrowing the coverage) is performed using Pcompensation.

(b) P_EMAX[legacy]>$P_{PowerClass}$ and P_EMAX[new]<$P_{PowerClass}$

In this case, Pcompensation=(P_EMAX[legacy]−$P_{PowerClass}$)−max{(P_EMAX[new]−P_EMAX[legacy]), 0}=(P_EMAX[legacy]−$P_{PowerClass}$) is established. That is, the same result as in (a) is obtained.

(c) P_EMAX[legacy]<$P_{PowerClass}$ and P_EMAX[new]<$P_{PowerClass}$

In this case, Pcompensation=−max{(P_EMAX[new]−P_EMAX[legacy]), 0} is established. This case is the same as the case in which the above-mentioned term of $P_{EMAX}$-compensation is provided for calculation on the "assumption that both of PmaxNew and Pmax are equal to $P_{PowerClass}$ or less than $P_{PowerClass}$."

(d) P_EMAX[legacy]<$P_{PowerClass}$ and P_EMAX[new]>$P_{PowerClass}$

In this case, Pcompensation=−max{($P_{PowerClass}$−P_EMAX[legacy]), 0}=−($P_{PowerClass}$−P_EMAX[legacy]) is obtained. In this case, compensation for widening the coverage is performed by ($P_{PowerClass}$−P_EMAX[legacy]).

In this example, the whole "($Q_{rxlevmin}$+$Q_{rxlevminoffset}$)+Qoffset$_{temp}$" may be referred to as a predetermined minimum reception level value. In this example, it can be considered that Srxlev is calculated using the following equation for the purpose of convenience.

Srxlev=measured value($Q_{rxlevmeas}$)−(constant ($Q_{rxlevmin}$)+Pcompensation)

As described in (c) or (d), Srxlev is calculated from a correction value, which is obtained by subtracting a compensation value (such as (P_EMAX[new]−P_EMAX[legacy]) or ($P_{PowerClass}$−P_EMAX[legacy])) based on the maximum transmission power value (such as P_EMAX[new] or $P_{PowerClass}$) from the predetermined minimum reception level value, and the reception level value ($Q_{rxlevmeas}$).

The example in which Equations (1) and (2) are used is suitable particularly for a case in which P_EMAX[legacy]<P_EMAX[new] is satisfied. That is, for example, when P_EMAX[legacy]>P_EMAX[new] is established in the case of (c), Pcompensation=0 is established and there is a possibility that P_EMAX[legacy]>P_EMAX[new] will not be reflected from the point of view of coverage. Therefore, Srxlev may be calculated using Equations (1) and (3) in consideration of the case of P_EMAX[legacy]>P_EMAX[new]. Equation (1) is the same as Equation (1) described above.

Srxlev=$Q_{rxlevmeas}$−($Q_{rxlevmin}$+$Q_{rxlevminoffset}$)−Pcompensation−Qoffset$_{temp}$ (1)

Pcompensation=max(P_EMAX[legacy]−$P_{PowerClass}$,0)−{min(P_EMAX[new], $P_{PowerClass}$)−min(P_EMAX[legacy], $P_{PowerClass}$)} (dB) (3)

In Equation (3), P_EMAX[legacy] corresponds to Pmax (existing p-Max) and P_EMAX[new] corresponds to PmaxNew.

When Equations (1) and (3) are used, this embodiment is not limited to the assumption that both of PmaxNew and Pmax are equal to $P_{PowerClass}$ or less than $P_{PowerClass}$. What Equation (3) becomes depending on a magnitude relationship of P_EMAX[legacy], P_EMAX[new], and $P_{PowerClass}$ will be described below.

(e) P_EMAX[legacy]>$P_{PowerClass}$ and P_EMAX[new]>$P_{PowerClass}$

In this case, Pcompensation=(P_EMAX[legacy]−$P_{PowerClass}$)−{$P_{PowerClass}$−$P_{PowerClass}$}=(P_EMAX[legacy]−$P_{PowerClass}$) is established. That is, when P_EMAX[legacy]>$P_{PowerClass}$ is satisfied, the maximum transmission power of the user equipment UE is limited to $P_{PowerClass}$ and thus compensation corresponding thereto (compensation for narrowing the coverage) is performed using Pcompensation.

(f) P_EMAX[legacy]>$P_{PowerClass}$ and P_EMAX[new]<$P_{PowerClass}$

In this case, Pcompensation=(P_EMAX[legacy]−$P_{PowerClass}$)−{P_EMAX[new]−$P_{PowerClass}$}(P_EMAX[legacy]−P_EMAX[new]) is established. In this case, compensation corresponding to (P_EMAX[legacy]−P_EMAX[new]) (compensation for narrowing the coverage) is performed.

(g) P_EMAX[legacy]<$P_{PowerClass}$ and P_EMAX[new]<$P_{PowerClass}$

In this case, Pcompensation=0−{P_EMAX[new]−P_EMAX[legacy]}=P_EMAX[legacy]−P_EMAX[new] is established. This case is the same as the case in which the above-mentioned term of $P_{EMAX}$-compensation is provided for calculation when P_EMAX[legacy]<P_EMAX[new] is satisfied. Unlike the case in which Equation (2) is used, when P_EMAX[legacy]>P_EMAX[new] is satisfied, compensation corresponding to (P_EMAX[legacy]−P_EMAX[new]) (compensation for narrowing the coverage) is performed.

(h) P_EMAX[legacy]>$P_{PowerClass}$ and P_EMAX[new]>$P_{PowerClass}$

In this case, Pcompensation=−($P_{PowerClass}$−P_EMAX[legacy]) is established. In this case, compensation for widening the coverage is performed by ($P_{PowerClass}$−P_EMAX[legacy]).

In this example, the whole "($Q_{rxlevmin}$+$Q_{rxlevminoffset}$)+Qoffset$_{temp}$" may be referred to as a predetermined minimum reception level value. In this example, it can be considered that Srxlev is calculated using the following equation for the purpose of convenience.

Srxlev=measured value($Q_{rxlevmeas}$)−(constant ($Q_{rxlevmin}$)+Pcompensation)

As described in (g) or (h), Srxlev is calculated from a correction value, which is obtained by subtracting a compensation value (such as (P_EMAX[new]−P_EMAX[legacy]) or ($P_{PowerClass}$−P_EMAX[legacy])) based on the maximum transmission power value (such as P_EMAX[new] or $P_{PowerClass}$) from the predetermined minimum reception level value, and the reception level value ($Q_{rxlevmeas}$).

According to the example in which Equations (1) and (3), Srxlev can be appropriately calculated when P_EMAX[legacy]>P_EMAX[new] is established as well as when P_EMAX[legacy]<P_EMAX[new] is established.

A modified example of a specification (3GPP TS 36.304) when Equations (1) and (3) are used is illustrated in FIG. 9 in the form in which changed parts in Non-Patent Document 5 are underlined. In FIG. 9, $P_{EMAX1}$ corresponds to P_EMAX[legacy] and $P_{EMAX2}$ corresponds to P_EMAX[new].

Second Embodiment

In the first embodiment, for example, the problem is solved by subtracting "$P_{EMAX}$-compensation" from the predetermined minimum reception level value ($Q_{rxlevmin}$), considering the final minimum reception level value as a new minimum reception level value, and calculating Srxlev. The method of solving the problem is not limited to the example, and the problem can be solved by the following method.

This method will be described as a second embodiment. Details different from those of the first embodiment will be mainly described below.

In this embodiment, Qrxievmin corresponding to the NS value and PmaxNew is used instead of "$P_{EMAX}$compensation," or Equations (1) and (2), or Equations (1) and (3). That is, in the related art, since a new UE and an old UE use the same $Q_{rxlevmin}$ (that is, the same q-RxLevMin), the problem described above with reference to FIG. 2 occurs. However, in this embodiment, a base station eNB broadcasts q-RxLevMin corresponding to the NS value and the PmaxNew to the user equipment UE using broadcast information. Accordingly, the user equipment UE can calculate Srxlev using $Q_{rxlevmin}$ (the minimum reception level) corresponding to the NS value/PmaxNew, thereby solving the problem.

In this embodiment, a description example (an extract) of a 3GPP specification (3GPP TS 36.331) for realizing broadcasting of NS values, PmaxNew, and new q-RxLevMin (which is referred to as q-RxLevMin-PmaxNew) corresponding thereto is illustrated in FIGS. 10 and 11 in the form in which changed parts in Non-Patent Document 2 are underlined.

As illustrated in FIGS. 10 and 11, in this example, the base station eNB transmits a list of NS values, PmaxNew, and q-RxLevMin-PmaxNew for each band using SIB1. The user equipment UE receiving the SIB1 selects a first (highest-priority) NS value (an additional spectrum emission value) which is supported by the user equipment UE from the list of NS values corresponding to a selected band (for example, a band indicated by freqBandIndicator), and selects PmaxNew and q-RxLevMin-PmaxNew corresponding to the selected NS value. When no NS value usable by the user equipment UE is present in the list, the user equipment UE uses the existing p-Max (Pmax) and the existing q-RxLevMin.

The transmission of the list of NS values, PmaxNew, and q-RxLevMin-PmaxNew using SIB1 is only an example. For example, PmaxNew and q-RxLevMin-PmaxNew may be transmitted using SIB1, and the NS values may be transmitted using SIB2.

The user equipment receiving information of SIB1 and selecting one NS value, PmaxNew, and q-RxLevMin-PmaxNew calculates $Q_{rxlevmin}$, for example, by "q-RxLevMin-PmaxNew×2" on the basis of q-RxLevMin-PmaxNew in cell selection. Srxlev is calculated using the following equation described in Non-Patent Document 5, and determination of "Srxlev>0" is performed.

$$Srxlev = Q_{rxlevmeas} - (Q_{rxlevmin} + Q_{rxlevminoffset}) - Pcompensation - Qoffset_{temp}$$

As described above in the first embodiment, it can be considered that Srxlev is calculated using the following equation for the purpose of convenience.

$$Srxlev = \text{measured value}(Q_{rxlevmeas}) - \text{constant}(Q_{rxlevmin})$$

When PmaxNew=23 dBm (new UE) and Pmax=17 dBm (old UE) are set as in the example illustrated in FIG. 2, it is assumed that the constant ($Q_{rxlevmin}$, constant calculated from q-RxLevMin-PmaxNew corresponding to PmaxNew) corresponding to PmaxNew=23 dBm is set to be smaller than a constant ($Q_{rxlevmin}$, a constant calculated from q-RxLevMin) corresponding to Pmax=17 dBm. For example, it is assumed that the constant ($Q_{rxlevmin}$) corresponding to PmaxNew=23 dBm is −131 dBm and the constant ($Q_{rxlevmin}$) corresponding to Pmax=17 dBm is −125 dBm. Then, the measured value ($Q_{rxlevmeas}$) for satisfying Srxlev>0 in the new UE is smaller than that in the old UE and the coverage in the new UE is widened.

That is, referring to FIG. 8, the coverage when q-RxLevMin-PmaxNew is not used (when the existing q-RxLevMin is used) is B, but the coverage is widened and the coverage indicated by A is obtained when q-RxLevMin-PmaxNew is used.

MODIFIED EXAMPLE

Hitherto, when a user equipment UE performs cell selection, an example in which Srxlev is calculated using $P_{EMAX}$-compensation, an example in which equations (1) and (2) are used, an example in which Equations (1) and (3) are used, and an example in which q-RxLevMin-PmaxNew is used have been described. Here, in cell reselection which is performed when a user equipment UE is handed over from a certain cell to another cell or the like, the same "cell selection criterion S" as in the cell selection is defined as one condition for selecting a serving cell (as a destination). That is, Srxlev>0 has to be satisfied in a serving cell (a target cell). Accordingly, similarly to the cell selection, a user equipment UE performs calculation of Srxlev using $P_{EMAX}$compensation, calculation of Srxlev using Equations (1) and (2), calculation of Srxlev using Equations (1) and (3), or calculation of Srxlev using q-RxLevMin-PmaxNew in the cell reselection. The parameters used for the calculation of Srxlev are parameters in the target cell, and the parameters are broadcasted from a base station eNB using SIB5 and SIB5 as will be described below.

In the communication system according to this embodiment, the cell reselection is classified into intra-frequency cell reselection and inter-frequency cell reselection.

In the intra-frequency cell reselection, when reception power of a reference signal in a serving cell is equal to or less than a predetermined value, a user equipment UE starts measuring reception power in a neighboring cell of the same frequency as a frequency of the cell (which may be referred to as a carrier frequency) and determines whether to be handed over to the neighboring cell on the basis of the measurement result.

On the other hand, in the inter-frequency cell reselection, the user equipment UE performs measurement of a neighboring cell of a frequency different from the frequency of the serving cell and determines whether to be handed over to the neighboring cell on the basis of the measurement result. In the inter-frequency cell reselection, information included in system information block type 5(SIB5) which is one of a plurality of types of system information transmitted from a base station eNB to the user equipment (Non-Patent Document 2) is used.

In the conventional SIB5 described in Non-Patent Document 2, "InterFreqCarrierFreqInfo" is present for each frequency of neighboring cells. "InterFreqCarrierFreqInfo" includes frequency (a value of a dl-CarrierFreq field), maximum transmission power (a value of a p-Max field), priority (a value of a cellReselectionPriority field), and various threshold values (values of threshX-High and threshX-Low fields and the like).

The value of p-Max corresponds to Pmax in a destination cell (a target cell). However, in the related art, since SIB5 does not include NS values of the target cell, there is a possibility that the p-Max will not be an optimal value for selecting the target cell.

Therefore, in this modified example, the SIB5 includes a plurality of NS values and p-Max values corresponding to the plurality of NS values (hereinafter referred to as PmaxNew) for each frequency of neighboring cells such that a user equipment UE can appropriately determine a destination cell in the inter-frequency cell reselection.

As described in the second embodiment, when q-RxLevMin-PmaxNew is used, the SIB5 includes a plurality of NS values and PmaxNew and q-RxLevMin-PmaxNew corresponding to the plurality of NS values for each frequency of neighboring cells.

The plurality of NS values for each frequency are broadcasted, for example, as a list in which the plurality of NS values are arranged in a decreasing order of priorities from the base station eNB to the user equipment UE. The plurality of PmaxNew values corresponding to the plurality of NS values are broadcasted as a list in which the PmaxNew values are arranged in the same order as the arrangement order of the NS values in the list of NS values. The NS values and the PmaxNew values corresponding to the NS values may be grouped into sets, a list in which the sets are arranged in the decreasing order of priories may be included in the SIB5, and the SIB5 may be broadcast from the base station eNB to the user equipment UE. When q-RxLevMin-PmaxNew is used, q-RxLevMin-PmaxNew corresponding to each of the NS values/PmaxNew is broadcasted.

Regarding the arrangement order in the list, the decreasing order of priorities is an example and an increasing order of priorities may be used.

When the calculation based on the first embodiment (the calculation using $P_{EMAX}$compensation, the calculation using Equations (1) and (2), or the calculation using Equations (1) and (3)) is performed and different frequencies broadcasted using the SIB5 are, for example, Frequency 1 and Frequency 2, the SIB5 includes "(NS value 1, PmaxNew 1), (NS value2, PmaxNew 2), and (NS value 3, PmaxNew 3)" for Frequency 1 and "(NS value 1, PmaxNew 1), (NS value 4, PmaxNew 4), and (NS value 5, PmaxNew 5)" for Frequency 2. For example, (NS value 1, PmaxNew 1) indicates that NS value 1 and PmaxNew 1 are correlated to each other.

For example, when a user equipment UE receiving the list included in the SIB5 determines whether to be handed over to a cell of "Frequency 1" in the inter-frequency cell reselection, the user equipment UE selects an NS value having a highest priority among the NS values usable by the user equipment UE at "Frequency 1" with reference to the list of NS values (or the list of sets of NS value and PmaxNew) corresponding to "Frequency 1" in the SIB5, selects PmaxNew corresponding to the NS value, calculates Srxlev using the selected PmaxNew, and determines whether "Srxlev>0" is satisfied. The calculation of Srxlev is the same as in the cell selection and uses $P_{EMAX}$compensation, Equations (1) and (2), or Equations (1) and (3).

For example, when the list corresponding to Frequency 1 includes "(NS value 1, PmaxNew 1), (NS value 2, PmaxNew 2), and (NS value 3, PmaxNew 3)," the user equipment UE supports NS value 2 and NS value 3, and NS value 2 has a priority higher than NS value 3, the user equipment UE selects NS value 2 and determines whether to be handed over to the cell of Frequency 1 using PmaxNew 2 corresponding to the selected NS value.

When the calculation based on the second embodiment (the calculation using q-RxLevMin-PmaxNew) is performed and different frequencies broadcasted using the SIB5 are, for example, Frequency 1 and Frequency 2, the SIB5 includes "(NS value 1, PmaxNew 1, q-RxLevMin-PmaxNew 1), (NS value 2, PmaxNew 2, q-RxLevMin-PmaxNew 2), and (NS value 3, PmaxNew 3, q-RxLevMin-PmaxNew 3)" for Frequency 1 and "(NS value 1, PmaxNew 1, q-RxLevMin-PmaxNew 1), (NS value 4, PmaxNew 4, q-RxLevMin-PmaxNew 4), and (NS value 5, PmaxNew 5, q-RxLevMin-PmaxNew 5)" for Frequency 2. For example, (NS value 1, PmaxNew 1, q-RxLevMin-PmaxNew 1) indicates that NS value 1, PmaxNew 1, and q-RxLevMin-PmaxNew 1 are correlated to each other.

For example, when a user equipment UE receiving the list included in the SIB5 determines whether to be handed over to a cell of "Frequency 1" in the inter-frequency cell reselection, the user equipment UE selects an NS value having a highest priority among the NS values usable by the user equipment UE at "Frequency 1" with reference to the list of NS values (or the list of sets of NS value, PmaxNew, and q-RxLevMin-PmaxNew) corresponding to "Frequency 1" in the SIB5, selects PmaxNew and q-RxLevMin-PmaxNew corresponding to the NS values, calculates Srxlev using the selected q-RxLevMin-PmaxNew, and determines whether "Srxlev>0" is satisfied.

A description example (an extract) of the 3GPP specification (3GPP TS 36.331) corresponding to the modified example of SIB5 when the calculation described above in the first embodiment is illustrated in FIGS. 12 and 13. In FIGS. 12 and 13, changed parts in Non-Patent Document 2 are underlined.

FIG. 12 illustrates an extract of SystemInformationBlockType5 information element (SIB5). As illustrated in FIG. 12, multiMPR-InfoList is added as a list of MPR-Info. The multiMPR-InfoList is included for each frequency of neighboring cells. As will be described with reference to FIG. 13, in this example, multiMPR-InfoList is a list in which sets of additionalSpectrumEmission (an NS value) and p-Max value (PmaxNew) corresponding thereto are arranged in a priority order. When PmaxNew is not included in MPR-Info, a user equipment UE uses p-Max (Pmax) in InterFreqCarrierFreqInfo. When the user equipment UE does not support any additionalSpectrumEmission (NS value) in the list, the user equipment UE uses p-Max (Pmax) in InterFreqCarrierFreqInfo.

A description example (an extract) of the 3GPP specification (3GPP TS 36.331) corresponding to the modified example of SIB5 when the calculation described above in the second embodiment is illustrated in FIGS. 14 and 15. In FIGS. 14 and 15, changed parts in Non-Patent Document 2 are underlined.

As illustrated in FIGS. 14 and 15, a list of PmaxNew, NS values (additionalSpectrumEmission), and q-RxLevMin-PmaxNew is included. The user equipment UE receiving the SIB5 selects a first (highest-priority) NS value (an additional spectrum emission value) which is supported by the user equipment UE from the list corresponding to a frequency of a neighboring cell, and selects PmaxNew and q-RxLevMin-PmaxNew corresponding to the selected NS value. When no NS value usable by the user equipment UE is present in the list, the user equipment UE uses the existing p-Max (Pmax) and q-RxLevMin. FIGS. 14 and 15 illustrate only examples. Other than the examples illustrated in FIGS. 14 and 15, q-RxLevMin-PmaxNew may be added in the examples illustrated in FIGS. 12 and 13.

In the above-mentioned example, SIB5 which is used for the inter-frequency cell reselection has been described, but in the intra-frequency cell reselection, the p-Max values (corresponding to Pmax) which are used to determine whether to be handed over to a target cell are included in SIB3.

Similarly to SIB5, since existing SIB3 does not include NS values of a target cell, there is a possibility that the p-Max will not be an optimal value for selecting a target cell.

Therefore, in this modified example, the SIB3 includes a plurality of NS values for each destination cell (neighboring cell) and p-Max values corresponding to the plurality of NS values (hereinafter referred to as PmaxNew) such that a user equipment UE can appropriately determine whether to be handed over to a destination cell in the intra-frequency cell reselection. As will be described later, a method of not including a plurality of NS values and PmaxNew corresponding to the plurality of NS values in SIB3 can be used. Hereinafter, the method of including a plurality of NS values and PmaxNew corresponding to the plurality of NS values in SIB3 will be described as Method 1, and the method of not including a plurality of NS values and PmaxNew corresponding to the plurality of NS values in SIB3 will be described as Method 2. Both of Methods 1 and 2 are included in the modified example.

<Method 1>

The plurality of NS values included in SIB3 are broadcasted, for example, as a list in which the NS values are arranged in a decreasing order of priorities from the base station eNB to the user equipment UE. The plurality of PmaxNew values corresponding to the plurality of NS values are broadcasted as a list in which the PmaxNew values are arranged in the same order as the arrangement order of NS values in the list of NS values. The NS values and the PmaxNew values corresponding to the NS values may be grouped into sets, a list in which the sets are arranged in the decreasing order of priories may be included in the SIB3, and the SIB3 may be broadcasted from the base station eNB to the user equipment UE. When q-RxLevMin-PmaxNew is used, q-RxLevMin-PmaxNew values corresponding to each of the NS values/PmaxNew is broadcasted.

Regarding the arrangement order in the list, the decreasing order of priorities is an example and an increasing order of priorities may be used.

When the calculation based on the first embodiment (the calculation using $P_{EMAX}$ compensation, the calculation using Equations (1) and (2), or the calculation using Equations (1) and (3)) is performed, the SIB3 includes "(NS value 1, PmaxNew 1), (NS value 2, PmaxNew 2), and (NS value 3, PmaxNew 3)" as a list of sets of NS values and PmaxNew values which can be used in a destination cell.

When a user equipment UE receiving the list included in the SIB3 determines whether to be handed over to another cell of the same frequency, the user equipment UE selects an NS value having a highest priority among the NS values usable by the user equipment UE with reference to the list of NS values (or the list of sets of NS value and PmaxNew) in the SIB3, selects PmaxNew corresponding to the NS value, and performs determination using the selected PmaxNew. That is, the user equipment UE calculates Srxlev using the selected PmaxNew and determines whether "Srxlev>0" is satisfied. The calculation of Srxlev is the same as in the cell selection and uses $P_{EMAX}$ compensation, Equations (1) and (2), or Equations (1) and (3).

When the calculation based on the second embodiment (the calculation using q-RxLevMin-PmaxNew) is performed, for example, "(NS value 1, PmaxNew 1, q-RxLevMin-PmaxNew 1), (NS value 2, PmaxNew 2, q-RxLevMin-PmaxNew 2), and (NS value 3, PmaxNew 3, q-RxLevMin-PmaxNew 3)" is included in the SIB3 as the list of sets of NS values, PmaxNew, and q-RxLevMin-PmaxNew values which can be used in a destination cell.

When a user equipment UE receiving the list included in the SIB3 determines whether to be handed over to another cell of the same frequency, the user equipment UE selects an NS value having a highest priority among the NS values usable by the user equipment UE with reference to the list of NS values (or the list of sets of NS value, PmaxNew, and q-RxLevMin-PmaxNew) in the SIB3, selects PmaxNew and q-RxLevMin-PmaxNew corresponding to the NS value, and performs determination using the selected q-RxLevMin-PmaxNew. That is, the user equipment UE calculates Srxlev using the selected q-RxLevMin-PmaxNew and determines whether "Srxlev>0" is satisfied.

A description example (an extract) of the 3GPP specification (3GPP TS 36.331) corresponding to the modified example of SIB3 when the calculation described above in the first embodiment is illustrated in FIGS. 16 and 17. In FIGS. 16 and 17, changed parts in Non-Patent Document 2 are underlined.

FIG. 16 illustrates an extract of SystemInformationBlockType3 information element (SIB3). As illustrated in FIG. 16, multiMPR-InfoList is added as a list of MPR-Info. As will be described with reference to FIG. 17, in this example, multiMPR-InfoList is a list in which sets of additionalSpectrumEmission (NS value) and p-Max value (PmaxNew) corresponding thereto are arranged in a priority order. When p-Max (PmaxNew) is not included in MPR-Info, a user equipment UE uses p-Max (Pmax) in InterFreqCarrierFreqInfo. When the user equipment UE does not support any additionalSpectrumEmission (NS value) in the list, the user equipment UE uses p-Max (Pmax) in InterFreqCarrierFreqInfo.

A description example (an extract) of the 3GPP specification (3GPP TS 36.331) corresponding to the modified example of SIB3 when the calculation described above in the second embodiment is illustrated in FIGS. 18 and 19. In FIGS. 18 and 19, changed parts in Non-Patent Document 2 are underlined.

As illustrated in FIGS. 18 and 19, a list of PmaxNew, NS values (additionalSpectrumEmission), and q-RxLevMin-PmaxNew is included. The user equipment UE receiving the SIB3 selects a first (highest-priority) NS value (an additional spectrum emission value) which is supported by the user equipment UE, and selects PmaxNew and q-RxLevMin-PmaxNew corresponding to the selected NS value. When no NS value usable by the user equipment UE is present in the list, the user equipment UE uses the existing p-Max (Pmax) and q-RxLevMin. FIGS. 18 and 19 illustrate only examples. Other than the examples illustrated in FIGS. 18 and 19, q-RxLevMin-PmaxNew may be added in the examples illustrated in FIGS. 16 and 17.

<Method 2>

In Method 1, a plurality of NS values and PmaxNew corresponding to the plurality of NS values are included in SIB3, but in Method 2, existing SIB3 (for example, details of "SystemInformationBlockType3 information element" described in Non-Patent Document 2) can be used as SIB3.

In Method 2, a user equipment UE receiving SIB3 replaces p-Max in the SIB3 with PmaxNew selected (sued) from a plurality of PmaxNew values in SIB1 and performs determination using the PmaxNew. That is, the user equipment UE calculates Srxlev using the PmaxNew and determines whether "Srxlev >0" is satisfied. The calculation of Srxlev is the same as in the cell selection and uses $P_{EMAX}$ compensation, Equations (1) and (2), or Equations (1) and (3).

A description example (an extract) of the 3GPP specification (5.2.2.10 of 3GPP TS 36.331) in Method 2 is illustrated in FIG. 20. Changed parts in Non-Patent Document 2 are underlined.

As described above, a list of NS values and PmaxNew in a band usable by a user equipment UE is included in SIB1, and the user equipment UE selects an NS value having a highest priority (which is firstly listed) which can be used by the user equipment UE and selects PmaxNew corresponding to the selected NS value.

When SIB3 is received, the user equipment UE replaces p-Max in SIB3 with PmaxNew (which is marked by "additionalPmax" in FIG. 20) selected from SIB1. That is, the user equipment UE considers PmaxNew selected from SIB1 to be p-Max in SIB3 and performs the intra-frequency cell reselection.

When the operation of Method 2 is performed, a plurality of NS values and PmaxNew corresponding to the plurality of NS values in addition to p-Max may be included in SIB3. In this case, for example, the user equipment UE may select which of Method 1 and Method 2 to perform by setting. The setting may be fixedly performed by the user equipment UE or may be performed by signaling from a base station eNB.

An example of SIB1 is illustrated in FIGS. 4 and 5, and another example of SIB1 is illustrated in FIGS. 21 and 22. Both examples of SIB1 are the same as each other in that they are SIB1 for realizing broadcasting of a list of NS values and PmaxNew. SIB1 illustrated in FIGS. 21 and 22 corresponds to description of the operation associated with SIB3 illustrated in FIG. 20, and "NS-PmaxList" is added as the list of NS values and PmaxNew.

FIG. 23 illustrates a modified example of a specification in which operations of a user equipment UE receiving SIB1 illustrated in FIG. 21 are described. The operations described in the underlined parts in FIG. 23 are basically the same as the operations described above with reference to FIGS. 4 and 5. That is, the user equipment UE selects a first (highest-priority) NS value (an additional spectrum emission value) supported by the user equipment UE from the list of NS values corresponding to a selected band (for example, a band indicated by freqBandIndicator), and selects PmaxNew ("additionalPmax") corresponding to the selected NS value.

(Device Configuration)

An example of a configuration of a user equipment UE and a base station eNB in the embodiments (which include the first and second embodiments and the modified examples) will be described below.

<User Equipment UE>

Figure 24:
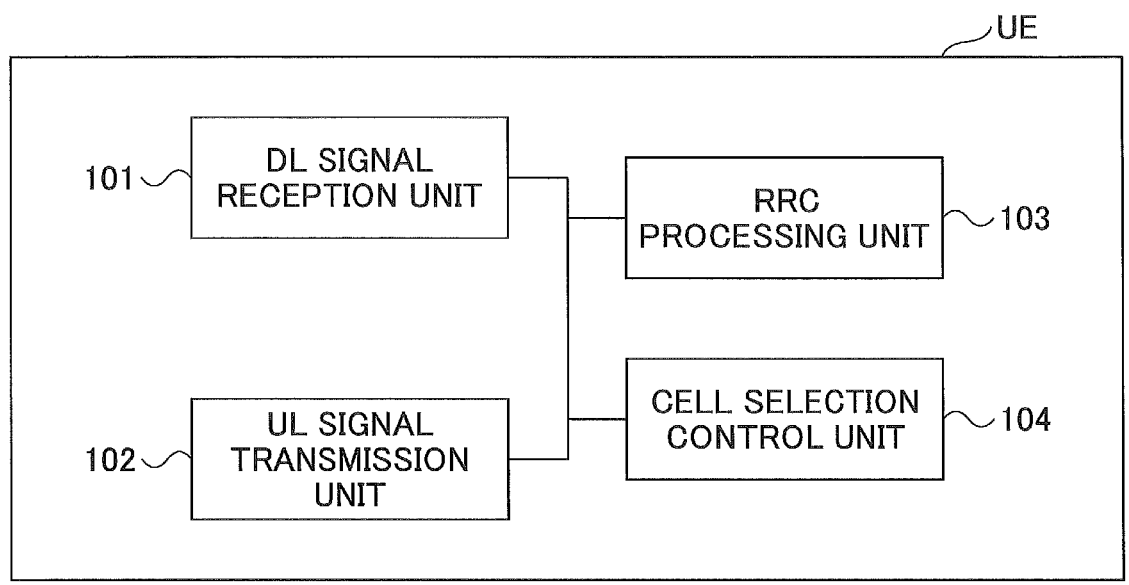
FIG. 24 is a diagram illustrating a configuration of a user equipment UE.

FIG. 24 is a diagram illustrating an example of a functional configuration of a user equipment UE. As illustrated in FIG. 24, the user equipment UE includes a DL signal reception unit 101, a UL signal transmission unit 102, an RRC processing unit 103, and a cell selection control unit 104. FIG. 24 illustrates only functional units, which are particularly associated with the invention, in the user equipment UE. The user equipment UE has at least a function, which is not illustrated, for performing operations based on LTE.

The DL signal reception unit 101 has a function of receiving various downlink signals from the base station eNB and acquiring information of an upper layer from the received signals of a physical layer. The UL signal transmission unit 102 has a function of generating various signals of a physical layer from the information of an upper layer to be transmitted from the user equipment UE and transmitting the generated signals to the base station eNB.

The RRC processing unit 103 performs receiving and reading of SIB1, SIB2, SIB3, SIB5, and the like described in the embodiments (which include the first and second embodiments and the modified examples) and performs processes of selecting an NS value, selecting PmaxNew/Pmax and q-RxLevMin-PmaxNew/q-RxLevMin, and the like. The RRC processing unit 103 can also perform the process of replacing p-Max in SIB3 with PmaxNew selected from SIB1 when SIB3 is received as described in Method 2. The RRC processing unit 103 may be referred to as a selection unit or selection means.

The cell selection control unit 104 has a function of performing cell selection and cell reselection. That is, the cell selection control unit 104 includes control means configured to perform cell selection or cell reselection using maximum transmission power (PmaxNew)/minimum reception level (q-RxLevMin-PmaxNew, $Q_{rxlevmin}$) corresponding to a selected NS value. The cell selection control unit 104 may be referred to as a control unit or control means.

The configuration of the user equipment UE illustrated in FIG. 24 may be embodied by a hardware circuit (for example, one or more IC chips) as a whole, or a part thereof may be embodied by a hardware circuit and the other part may be embodied by a CPU and a program.

Figure 25:
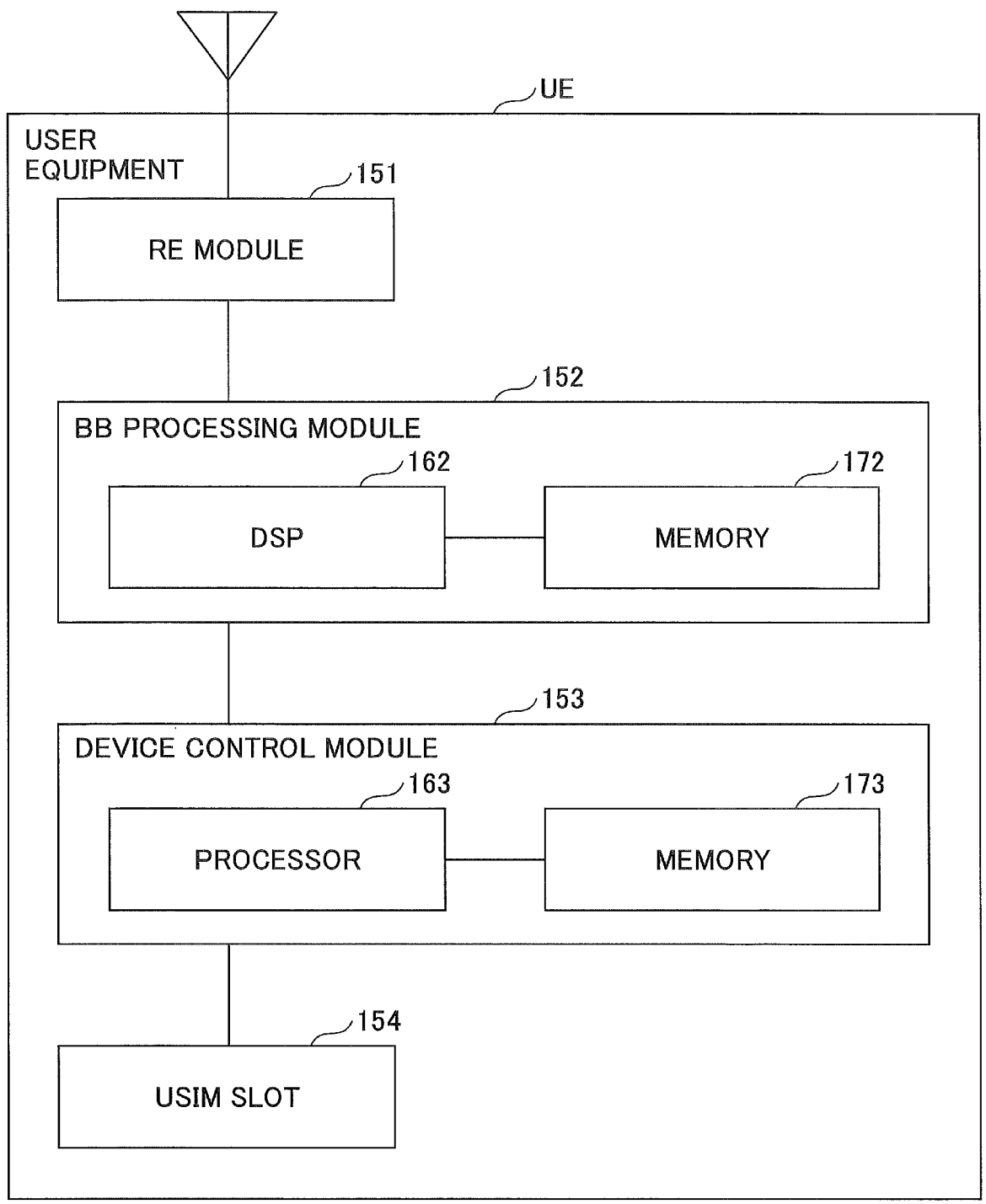
FIG. 25 is a diagram illustrating a HW configuration of a user equipment UE.

FIG. 25 is a diagram illustrating an example of a hardware (HW) configuration of a user equipment UE. FIG. 25 illustrates a configuration closer to a mounting example than in FIG. 24. As illustrated in FIG. 25, the user equipment UE includes a radio equipment (RE) module 151 that performs processing associated with a radio signal, a baseband (BB) processing module 152 that performs baseband signal processing, a device control module 153 that processes an upper layer or the like, and a USIM slot 154 that is an interface for access with a USIM card.

The RE module 151 generates radio signals to be transmitted from an antenna by performing digital-to-analog (D/A) conversion, modulation, frequency conversion, power amplification, and the like on a digital baseband signal received from the BB processing module 152. The RE module 151 generates a digital baseband signal by performing frequency conversion, analog-to-digital (A/D) conversion, modulation, and the like on received radio signals, and sends out the generated digital baseband signal to the BB processing module 152. The RE module 151 has, for example, a function of a physical layer or the like in the DL signal reception unit 101 and the UL signal transmission unit 102 illustrated in FIG. 24.

The BB processing module 152 performs a process of converting an IP packet and a digital baseband signal into each other. A digital signal processor (DSP) 162 is a processor that performs signal processing in the BB processing module 152. A memory 172 is used as a work area of the DSP 162. The BB processing module 152 has, for example, a function of Layer 2 in the DL signal reception unit 101 and the UL signal transmission unit 102 illustrated in FIG. 24 and the functions of the RRC processing unit 103 and the cell selection control unit 104. All or a part of the functions of the RRC processing unit 103 and the cell selection control unit 104 may be included in the device control module 153.

The device control module 153 performs protocol processing of an IP layer, processing of various applications, and the like. A processor 163 is a processor that performs processing which is performed by the device control module 153. A memory 173 is used as a work area of the processor 163. The processor 163 reads and writes data with respect to a USIM via the USIM slot 154.

<Base Station eNB>

Figure 26:
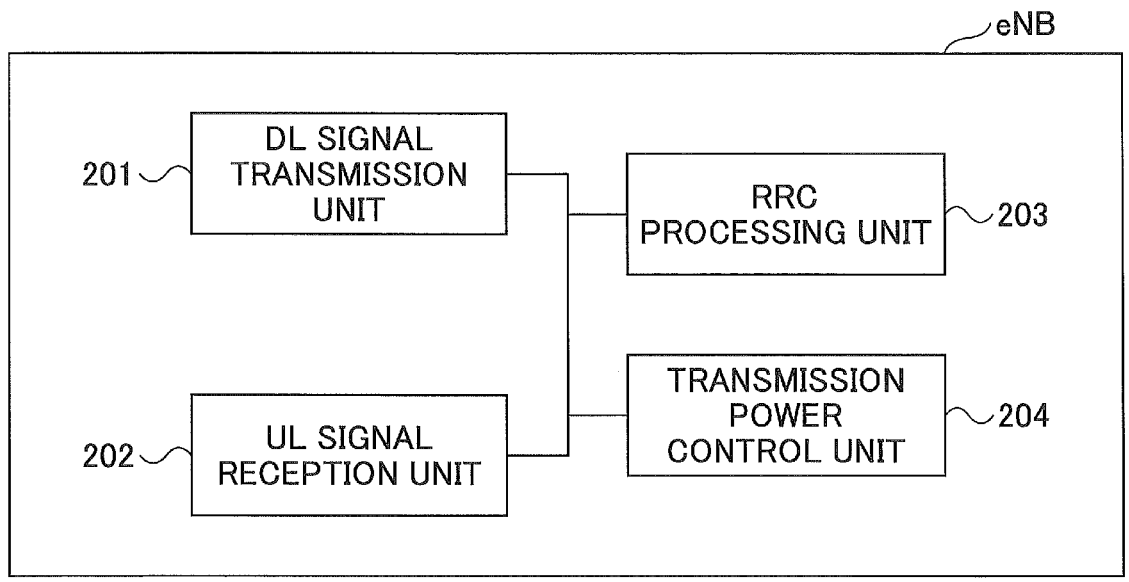
FIG. 26 is a diagram illustrating a configuration of a base station eNB.

FIG. 26 is a diagram illustrating an example of a functional configuration of a base station eNB. As illustrated in FIG. 26, the base station eNB includes a DL signal transmission unit 201, a UL signal reception unit 202, an RRC processing unit 203, and a transmission power control unit 204. FIG. 26 illustrates only functional units, which are particularly associated with the embodiments of the invention, in the base station eNB. The base station eNB also has at least a function, which is not illustrated, for performing operations based on LTE.

The DL signal transmission unit 201 has a function of generating various signals of a physical layer from information of an upper layer to be transmitted from the base station eNB and transmitting the generated signals. The UL signal reception unit 202 has a function of receiving various uplink signals from the user equipment UE and acquiring information of an upper layer from the received signals of the physical layer.

The RRC processing unit 203 generates and transmits SIB1, SIB2, SIB3, SIB5, and the like described above in the embodiments (which include the first and second embodiments and the modified examples). The transmission power control unit 204 performs scheduling for the user equipment UE, UL power control, and the like, for example, in consideration of the maximum transmission power of the user equipment UE.

The configuration of the base station eNB illustrated in FIG. 26 may be embodied by a hardware circuit (for example, one or more IC chips) as a whole, or a part thereof may be embodied by a hardware circuit and the other part may be embodied by a CPU and a program.

Figure 27:
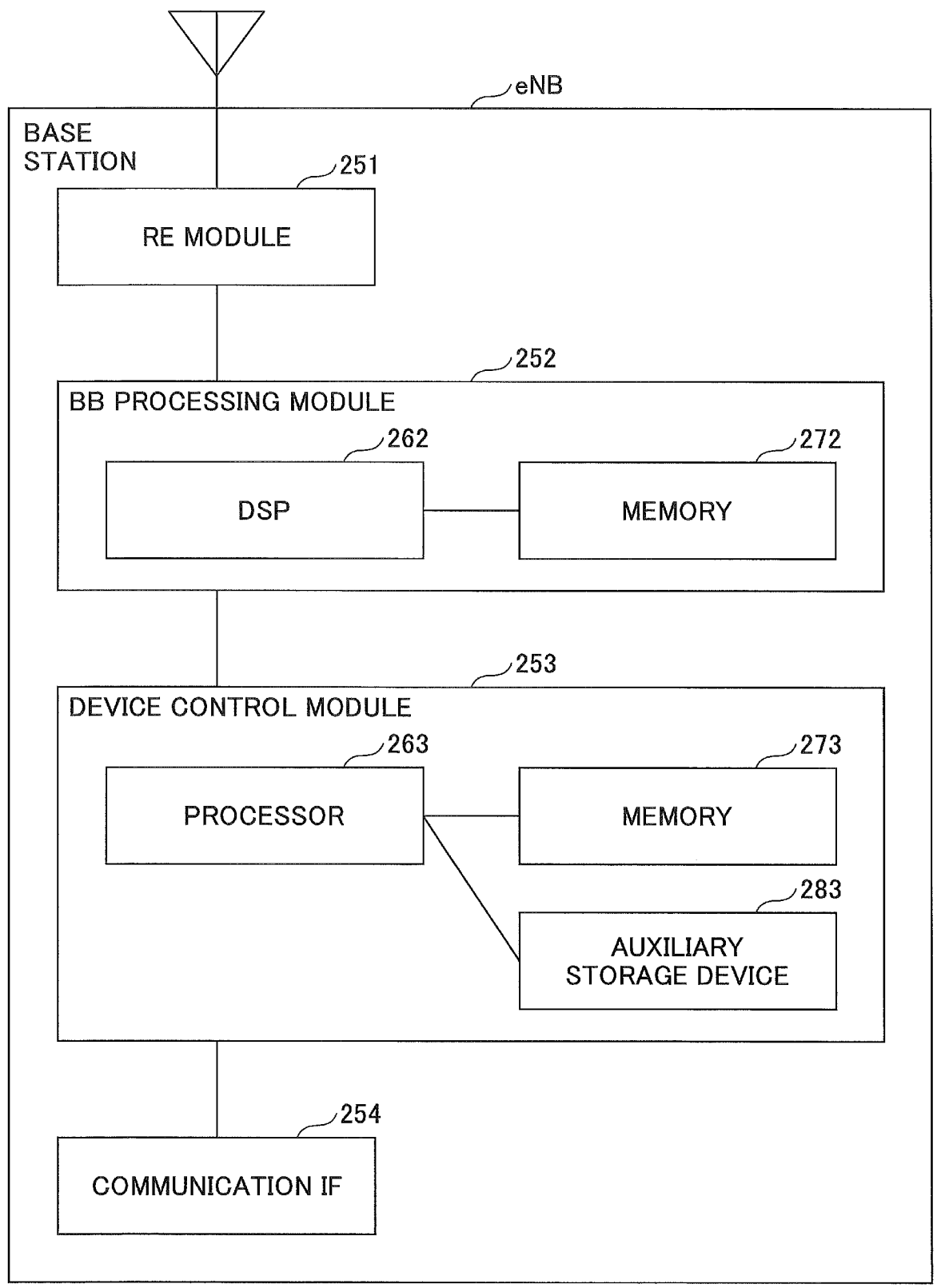
FIG. 27 is a diagram illustrating a HW configuration of a base station eNB.

FIG. 27 is a diagram illustrating an example of a hardware (HW) configuration of a base station eNB. FIG. 27 illustrates a configuration closer to a mounting example than in FIG. 26. As illustrated in FIG. 27, the base station eNB includes an RE module 251 that performs processing associated with radio signals, a BB processing module 252 that performs baseband signal processing, a device control module 253 that performs processing of an upper layer or the like, and a communication IF 254 that is an interface for access to a network.

The RE module 251 generates radio signals to be transmitted from an antenna by performing D/A conversion, modulation, frequency conversion, power amplification, and the like on a digital baseband signal received from the BB processing module 252. The RE module 251 generates a digital baseband signal by performing frequency conversion, A/D conversion, modulation, and the like on received radio signals, and sends out the generated digital baseband signal to the BB processing module 252. The RE module 251 has, for example, a function of a physical layer or the like in the DL signal transmission unit 201 and the UL signal reception unit 202 illustrated in FIG. 26.

The BB processing module 252 performs a process of converting an IP packet and a digital baseband signal into each other. A DSP 262 is a processor that performs signal processing in the BB processing module 252. A memory 272 is used as a work area of the DSP 262. The BB processing module 252 has, for example, a function of Layer 2 in the DL signal transmission unit 201 and the UL signal reception unit 202 illustrated in FIG. 26 and the functions of the RRC processing unit 203 and the transmission power control unit 204. All or a part of the functions of the RRC processing unit 203 and the transmission power control unit 204 may be included in the device control module 253.

The device control module 253 performs protocol processing of an IP layer, OAM processing, and the like. A processor 263 is a processor that performs processing which is performed by the device control module 253. A memory 273 is used as a work area of the processor 263. An auxiliary storage unit 283 is, for example, an HDD and stores a variety of setting information for causing the base station eNB to operate.

The configurations (functional subdivisions) of the devices illustrated in FIGS. 24 to 27 are only an example. As long as the processing described in the embodiments (which include the first and second embodiments and the modified examples) can be realized, the mounting method (such as arrangement and names of specific functional units) is not limited to a specific mounting method.

The user equipment UE and the base station eNB may have all the functions of the first and second embodiments and the modified examples, or may have only the functions of the first embodiment and the modified example corresponding thereto or only the functions of the second embodiment and the modified example corresponding thereto.

Conclusion of Embodiments

As described above, according to the embodiments, there is provided a user equipment in a mobile communication system including a base station and the user equipment, the user equipment including: selection means configured to receive a plurality of signaling values and a plurality of maximum transmission power values corresponding to the plurality of signaling values from the base station, to select one signaling value of the plurality of signaling values, and to select the maximum transmission power value corresponding to the selected signaling value; and control means configured to perform cell selection or cell reselection by determining whether a reception level value in a cell to be determined satisfies a predetermined condition using a correction value, which is obtained by subtracting a compensation value based on the maximum transmission power value from a minimum reception level value predetermined for the cell to be determined in the cell selection or cell reselection, and the reception level value measured for the cell to be determined.

According to the above-mentioned configuration, in a mobile communication system in which a plurality of signaling values and maximum transmission power values corresponding to the signaling values are transmitted from a base station, a user equipment can appropriately perform cell selection or cell reselection.

The selection means may receive a common maximum transmission power value which does not correspond to any one of the plurality of signaling values, and the control means may calculate the compensation value by subtracting the common maximum transmission power value from the maximum transmission power value.

It is considered that the "common maximum transmission power value" (corresponding to Pmax, p-Max, or the like in the embodiments) is applied to an old UE in which A-MPR is not permitted and is a value less than the maximum transmission power value (PmaxNew) corresponding to the selected signaling value. By subtracting the common maximum transmission power value from the maximum transmission power value to calculate the compensation value, it is possible to calculate an appropriate compensation value in consideration of the UL maximum transmission power of a new UE.

For example, the plurality of signaling values are arranged in a priority order, and the selection means selects the signaling value having a highest priority of the signaling values supported by the user equipment among the plurality of signaling values. According to this configuration, the user equipment can select a signaling value most suitable for the user equipment and thus can select an optimal maximum transmission power value.

The predetermined condition is, for example, a condition that a value obtained by subtracting the correction value from the reception level value is greater than 0. According to this configuration, it is possible to enlarge the coverage in comparison with a case in which the correction value is not used.

The control means may use the maximum transmission power value received from the base station via SIB1 to perform cell selection and may use the maximum transmission power value received from the base station via SIB3 or SIB5 to perform cell reselection. According to this configuration, it is possible to use an appropriate maximum transmission power value depending on the purposes. The control means may use the maximum transmission power value received from the base station via SIB1 to perform cell reselection. According to this configuration, existing SIB3 can be used.

According to the embodiments, there is provided a user equipment in a mobile communication system including a base station and the user equipment, the user equipment including: selection means configured to receive a plurality of signaling values and a plurality of parameters (for example, q-RxLevMin-PmaxNew) corresponding to the plurality of signaling values from the base station, to select one signaling value of the plurality of signaling values, and to select the parameter corresponding to the selected signaling value; and control means configured to perform cell selection or cell reselection by determining whether a reception level value in a cell to be determined satisfies a predetermined condition using a lowest reception level value based on the parameter in the cell to be determined in the cell selection or cell reselection and the reception level value measured for the cell to be determined.

According to the embodiment, there is provided a user equipment in a mobile communication system including a base station and the user equipment, the user equipment including: selection means configured to receive a plurality of signaling values and a plurality of maximum transmission power values corresponding to the plurality of signaling values from the base station, to select one signaling value of the plurality of signaling values, and to select the maximum transmission power value corresponding to the selected signaling value; and control means configured to perform cell selection or cell reselection by determining whether at least Equation 1, Srxlev>0, is satisfied in a cell to be determined in the cell selection or cell reselection, wherein Srxlev in Equation 1 is expressed by Equation 2, Srxlev=$Q_{rxlevmeas}$−$Q_{rxlevmin}$+$Q_{rxlevminoffset}$)−Pcompensation, $Q_{rxlevmeas}$ in Equation 2 denotes a reception level value measured for the cell to be determined, Qrxievmin in Equation 2 denotes a minimum reception level required for the cell, and $Q_{rxlevminoffset}$ in Equation 2 denotes an offset, Pcompensation in Equation 2 is expressed by Equation 3, max ($P_{EMAX1}$−$P_{PwerClass}$, 0)−(min ($P_{EMAX2}$, $P_{PowerClass}$)−min($P_{EMAX1}$, $P_{PowerClass}$)), and $P_{EMAX1}$ in Equation 3 denotes a predetermined maximum transmission power value, $P_{EMAX2}$ in Equation 3 denotes a maximum transmission power value selected by the selection means, and $P_{Powerclass}$ in Equation 3 denotes a maximum output power value based on a power class of the user equipment.

According to the embodiments, there is provided a mobile communication system including a base station and a user equipment, wherein the base station includes means configured to transmit a plurality of signaling values and a plurality of parameters (for example, q-RxLevMin-PmaxNew) corresponding to the plurality of signaling values, and the user equipment includes: selection means configured to receive the plurality of signaling values and the plurality of parameters corresponding to the plurality of signaling values from the base station, to select one signaling value of the plurality of signaling values, and to select the parameter corresponding to the selected signaling value; and control means configured to perform cell selection or cell reselection by determining whether a reception level value in a cell to be determined satisfies a predetermined condition using a lowest reception level value based on the parameter in the cell to be determined in the cell selection or cell reselection and the reception level value measured for the cell to be determined.

"Means" in the configurations of the devices may be replaced with "units," "circuits," "devices," or the like.

The user equipment UE described in the embodiments may have a configuration which includes a CPU and a memory and which is embodied by causing the CPU (processor) to execute a program, may have a configuration which is embodied by hardware such as a hardware circuit having logics of the processing described in the embodiments, or may have a configuration in which a program and hardware are mixed.

The base station eNB described in the embodiments may have a configuration which includes a CPU and a memory and which is embodied by causing the CPU (processor) to execute a program, may have a configuration which is embodied by hardware such as a hardware circuit having logics of the processing described in the embodiments, or may have a configuration in which a program and hardware are mixed.

While embodiments of the invention have been described above, the invention disclosed herein is not limited to the embodiments and it will be understood by those skilled in the art that various modifications, corrections, alternatives, substitutions, and the like can be made. While description has been made using specific numerical value examples for the purpose of promoting understanding of the invention, such numerical values are only simple examples and arbitrary appropriate values may be used unless otherwise specified. The sorting of items in the above description is not essential to the invention, details described in two or more items may be combined for use if necessary, or details described in a certain item may be applied to details described in another item (unless incompatible). Boundaries between functional units or processing units in the functional block diagrams cannot be said to be necessarily correspond to boundaries of physical components. Operations of a plurality of functional units may be physically performed by one component, or an operation of one functional unit may be physically performed by a plurality of components. For the purpose of convenience of explanation, while a user equipment UE and a base station eNB have been described above with reference to functional block diagrams, such devices may be embodied by hardware, by software, or by combination thereof. Software which is executed by a processor of the user equipment UE and software which is executed by a processor of the base station eNB in the embodiments of the invention may be stored in an appropriate storage medium such as a random access memory (RAM), a flash memory, a read only memory (ROM), an EPROM, an EEPROM, a register, a hard disk (HDD), a removable disk, a CD-ROM, a database, or a server.

<Complement of Embodiments>

Transmission of the information is not limited to the aspects/embodiments described in the invention, but may be performed by other methods. For example, transmission of the information may be performed by physical layer signaling (such as downlink control information (DCI) or uplink control information (UCI)), upper layer signaling (such as radio resource control (RRC) signaling, medium access control (MAC) signaling, broadcast information (such as a master information block (MIB) or a system information block (SIB)), other signaling, or a combination thereof. The RRC message may be referred to as RRC signaling. An RRC message may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The input and output information or the like may be stored in a specific place (for example, a memory) or may be managed in a management table. The input and output information or the like may be overwritten, updated, or added. The output information or the like may be deleted. The input information or the like may be transmitted to another device.

Determination may be performed using a value (0 or 1) indicated by one bit, may be performed using a Boolean value (true or false), or may be performed by comparison of numerical values (for example, comparison with a predetermined value).

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The terms described in this specification and/or the terms required for understanding this specification may be substituted by terms having the same or similar meanings. For example, a channel and/or a symbol may be a signal. A signal may be a message.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The processing sequences and the like of the aspects/embodiments described above in this specification may be changed in the order as long as they are not incompatible with each other. For example, in the methods described in this specification, various steps as elements are described in an exemplary order and the methods are not limited to the described order.

The aspects/embodiments described in this specification may be used alone, may be used in combination, or may be switched with implementation thereof. Broadcasting of predetermined information (for example, broadcasting of "X") is not limited to explicit broadcasting, but may be performed by implicitly broadcasting, for example, by not performing broadcasting of the predetermined information.

The terms "determining" and "determination" which are used in this specification may include various types of operations. The terms "determining" and "determination" may include that calculating, computing, processing, deriving, investigating, looking up (for example, looking up in a table, a database, or another data structure), and ascertaining are considered to be "determined." The terms "determining" and "determination" may include that receiving (for example, receiving of information), transmitting (for example, transmitting of information), input, output, and accessing (for example, accessing data in a memory) are considered to be "determined." The terms "determining" and "determination" may include that resolving, selecting, choosing, establishing, and comparing are considered to be "determined." That is, the terms "determining" and "determination" can include that a certain operation is considered to be "determined."

An expression "on the basis of ~" which is used in this specification does not refer to only "on the basis of only ~," unless apparently described. In other words, the expression "on the basis of ~" refers to both "on the basis of only ~" and "on the basis of at least ~."

The invention is not limited to the above-mentioned embodiments and the invention includes various modifications, corrections, alternatives, and substitutions without departing from the concept of the invention.

This application claims priority from Japanese Patent Application No. 2015-168340, filed on Aug. 27, 2015, Japanese Patent Application No. 2015-188869, filed on Sep. 25, 2015, Japanese Patent Application No. 2015-199798, filed on Oct. 7, 2015, Japanese Patent Application No. 2015-216174, filed on Nov. 2, 2015, and Japanese Patent Application No. 2015-226978, filed on Nov. 19, 2015, and the contents of Japanese Patent Application No. 2015-168340, Japanese Patent Application No. 2015-188869, Japanese Patent Application No. 2015-199798, Japanese Patent Application No. 2015-216174, and Japanese Patent Application No. 2015-226978 are incorporated by reference herein in its entirety.

EXPLANATIONS OF LETTERS OR NUMERALS eNB base station
UE user equipment
101 DL signal reception unit
102 UL signal transmission unit
103 RRC processing unit
104 cell selection control unit
201 DL signal transmission unit
202 UL signal reception unit
203 RRC processing unit
204 transmission power control unit

The invention claimed is:

1. A user equipment in a mobile communication system including a base station and the user equipment, the user equipment comprising:
a receiver and a processor,
wherein the receiver receives a plurality of signaling values and a plurality of maximum transmission power values corresponding to the plurality of signaling values respectively from the base station,
wherein the processor selects one signaling value of the plurality of signaling values, and selects a maximum transmission power value corresponding to the selected signaling value,
wherein the processor performs cell selection or cell reselection by determining whether at least Equation 1, Srxlev >0, is satisfied in a cell to be determined in the cell selection or cell reselection, Srxlev denoting a cell selection reception level value, and wherein Srxlev in Equation 1 is expressed by Equation 2,
$Srxlev = Q_{rxlevmeas} - (Q_{rxievmin} + Q_{rxlevminoffset}) - P_{compensation}$;

$Q_{rxlevmeas}$ in Equation 2 denotes a reception level value measured for the cell to be determined, $Q_{rxievmin}$ in Equation 2 denotes a minimum reception level required for the cell, $Q_{rxlevminoffset}$ in Equation 2 denotes an offset, $P_{compensation}$ in Equation 2 is expressed by Equation 3, $\max(P_{EMAX1} - P_{powerclass}, 0) - (\min(P_{EMAX2}, P_{PowerClass}) - \min(P_{EMAX1}, P_{PowerClass}))$, and $P_{EMAX1}$ in Equation 3 denotes a predetermined maximum transmission power value, $P_{EMAX2}$ in Equation 3 denotes a maximum transmission power value selected by the processor, and $P_{PowerClass}$ in Equation 3 denotes a maximum output power value based on a power class of the user equipment.

2. A mobile communication system including a base station and the user equipment according to claim 1, wherein the base station transmits a plurality of signaling values and a plurality of maximum transmission power values corresponding to the plurality of signaling values respectively.

3. A cell selection method which is performed by a user equipment in a mobile communication system including a base station and the user equipment, the cell selection method comprising:

receiving a plurality of signaling values and a plurality of maximum transmission power values corresponding to the plurality of signaling values respectively from the base station, selecting one signaling value of the plurality of signaling values, and selecting a maximum transmission power value corresponding to the selected signaling value; and performing cell selection or cell reselection by determining whether at least Equation 1, Srxlev >0, is satisfied in a cell to be determined in the cell selection or cell reselection, Srxlev denoting a cell selection reception level value, wherein Srxlev in Equation 1 is expressed by Equation 2,
$Srxlev = Q_{rxlevmeas} - (Q_{rxievmin} + Q_{rxlevminoffset}) - P_{compensation}$;

$Q_{rxlevmeas}$ in Equation 2 denotes a reception level value measured for the cell to be determined, $Q_{rxievmin}$ in Equation 2 denotes a minimum reception level required for the cell, and $Q_{rxlevminoffset}$ in Equation 2 denotes an offset, $P_{compensation}$ in Equation 2 is expressed by Equation 3, $\max(P_{EMAX1} - P_{powerclass}, 0) - (\min(P_{EMAX2}, P_{PowerClass}) - \min(P_{EMAX1}, P_{PowerClass}))$, and $P_{EMAX1}$ in Equation 3 denotes a predetermined maximum transmission power value, $P_{EMAX2}$ in Equation 3 denotes a maximum transmission power value selected by the processor, and $P_{PowerClass}$ in Equation 3 denotes a maximum output power value based on a power class of the user equipment.

4. A user equipment in a mobile communication system including a base station and the user equipment, the user equipment comprising:

a receiver and a processor, wherein the receiver receives a plurality of signaling values and a plurality of maximum transmission power values corresponding to the plurality of signaling values respectively from the base station, wherein the processor selects one signaling value of the plurality of signaling values, and selects a maximum transmission power value corresponding to the selected signaling value, wherein the processor performs cells selection or cell reselection by determining whether at least Equation 1, Srxlev >0, is satisfied in a cell to be determined in the cell selection or cell reselection, Srxlev denoting a cell selection reception level value, and wherein Srxlev in Equation 1 is expressed by Equation 2,
$Srxlev = Q_{rxlevmeas} - (Q_{rxievmin} + Q_{rxlevminoffset}) - P_{compensation} - Q_{offsettemp}$;

$Q_{rxlevmeas}$ in Equation 2 denotes a reception level value measured for the cell to be determined, $Q_{rxievmin}$ in Equation 2 denotes a minimum reception level required for the cell, $Q_{rxlevminoffset}$ in Equation 2 denotes an offset, and $Q_{offsettup}$ in Equation 2 denotes a parameter used when a timer expires, $P_{compensation}$ in Equation 2 is expressed by Equation 3, $\max(P_{EMAX1} - P_{powerclass}, 0) - (\min(P_{EMAX2}, P_{PowerClass}) - \min(P_{EMAX1}, P_{PowerClass}))$, and $P_{EMAX1}$ in Equation 3 denotes a predetermined maximum transmission power value, $P_{EMAX2}$ in Equation 3 denotes a maximum transmission power value selected by the processor, and $P_{PowerClass}$ in Equation 3 denotes a maximum output power value based on a power class of the user equipment.

5. A mobile communication system including a base station and the user equipment according to claim 4, wherein the base station transmits a plurality of signaling values and a plurality of maximum transmission power values corresponding to the plurality of signaling values respectively.

6. A cell selection method which is performed by a user equipment in a mobile communication system including a base station and the user equipment, the cell selection method comprising:

receiving a plurality of signaling values and a plurality of maximum transmission power values corresponding to the plurality of signaling values respectively from the base station, selecting one signaling value of the plurality of signaling values, and selecting a maximum transmission power value corresponding to the selected signaling value; and performing cell selection or cell reselection by determining whether at least Equation 1, Srxlev >0, is satisfied in a cell to be determined in the cell selection or cell reselection, Srxlev denoting a cell selection reception level value, wherein Srxlev in Equation 1 is expressed by Equation 2,
$Srxlev = Q_{rxlevmeas} - (Q_{rxievmin} + Q_{rxlevminoffset}) - P_{compensation} - Q_{offsettemp}$;

$Q_{rxlevmeas}$ in Equation 2 denotes a reception level value measured for the cell to be determined, $Q_{rxievmin}$ in Equation 2 denotes a minimum reception level required for the cell, $Q_{rxlevminoffset}$ in Equation 2 denotes an offset, and $Q_{offsettemp}$ in Equation 2 denotes a parameter used when a timer expires, $P_{compensation}$ in Equation 2 is expressed by Equation 3, $\max(P_{EMAX1} - P_{powerclass}, 0) - (\min(P_{EMAX2}, P_{PowerClass}) - \min(P_{EMAX1}, P_{PowerClass}))$, and $P_{EMAX1}$ in Equation 3 denotes a predetermined maximum transmission power value, $P_{EMAX2}$ in Equation 3 denotes a maximum transmission power value selected by the processor, and $P_{PowerClass}$ in Equation 3 denotes a maximum output power value based on a power class of the user equipment.

\* \* \* \* \*